(12) United States Patent
Shimbo et al.

(10) Patent No.: US 11,393,185 B2
(45) Date of Patent: Jul. 19, 2022

(54) MONITORING DEVICE

(71) Applicant: Mitsubishi Electric Corporation, Chiyoda-ku (JP)

(72) Inventors: Kenichi Shimbo, Chiyoda-ku (JP); Kyosuke Isono, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/473,813

(22) PCT Filed: Dec. 13, 2017

(86) PCT No.: PCT/JP2017/044755
§ 371 (c)(1),
(2) Date: Jun. 26, 2019

(87) PCT Pub. No.: WO2018/142779
PCT Pub. Date: Aug. 9, 2018

(65) Prior Publication Data
US 2019/0347502 A1    Nov. 14, 2019

(30) Foreign Application Priority Data

Feb. 6, 2017   (JP) .............................. JP2017-019471

(51) Int. Cl.
*G06K 9/32*     (2006.01)
*G06V 10/20*    (2022.01)
(Continued)

(52) U.S. Cl.
CPC ............ *G06V 10/255* (2022.01); *G01S 17/89* (2013.01); *G06T 7/521* (2017.01); *H04L 43/022* (2013.01);
(Continued)

(58) Field of Classification Search
None
See application file for complete search history.

(56) References Cited

U.S. PATENT DOCUMENTS

2015/0009292 A1* 1/2015 Fukata ............... G06K 9/00201
348/46
2018/0165828 A1* 6/2018 Sasatani ............. G06K 9/00201

FOREIGN PATENT DOCUMENTS

EP       2 821 982 A1    1/2015
JP       2005-216160 A   8/2005
(Continued)

OTHER PUBLICATIONS

Content Selection Using Frontalness Evaluation of Multiple Frames. Eum et al. (Year: 2016).*

(Continued)

*Primary Examiner* — Delomia L Gilliard
(74) *Attorney, Agent, or Firm* — Oblon, McClelland, Maier & Neustadt, L.L.P.

(57) ABSTRACT

A monitoring device conducts a process of obtaining pieces of distance data representing distances to a plurality of physical objects present in a monitoring region, from measurement results of the monitoring region, and using the distance data as current distance data; obtaining past distance data from the measurement results, and converting the past distance data into comparison distance data; calculating difference values between the current distance data and the comparison distance data, and extracting changed regions whose difference values are greater than or equal to a threshold; creating an image obtained by transforming a frontal viewpoint image such that a viewpoint of the measurement of the monitoring region is moved, the frontal viewpoint image being based on the current distance data and the changed regions; and identifying the plurality of (Continued)

physical objects present in the monitoring region, on the basis of the frontal viewpoint image and the coordinate transformed image.

6 Claims, 27 Drawing Sheets

(51) Int. Cl.
    *G06T 7/521*     (2017.01)
    *H04N 5/232*     (2006.01)
    *G01S 17/89*     (2020.01)
    *H04L 43/022*     (2022.01)
    *H04L 43/0823*     (2022.01)
    *H04L 43/16*     (2022.01)
    *H04N 7/18*     (2006.01)

(52) U.S. Cl.
    CPC .......... *H04L 43/0847* (2013.01); *H04L 43/16* (2013.01); *H04N 5/23229* (2013.01); *H04N 5/232945* (2018.08); *H04N 7/18* (2013.01)

(56) References Cited

FOREIGN PATENT DOCUMENTS

| JP | 2005300259 A | * | 10/2005 |
| WO | WO 2016/002776 A1 | | 1/2016 |
| WO | WO2016002776 A1 | * | 1/2016 |
| WO | WO 2016/199244 A1 | | 12/2016 |

OTHER PUBLICATIONS

International Search Report dated Mar. 20, 2018 in PCT/JP2017/044755 filed Dec. 13, 2017.
Office Action dated Apr. 16, 2021 in Europe Application No. 17 894 899.8-1222; 6 pgs.
Summons to attend oral proceedings pursuant to Rule 115(1) EPC dated Feb. 25. 2022 in corresponding European Patent Application No. 17 894 899.8; 9 pages.

* cited by examiner

MONITORING DEVICE

TECHNICAL FIELD

The invention relates to a monitoring device that recognizes objects present in a monitoring region.

BACKGROUND ART

Conventionally, there is a technique for detecting and recognizing an object using a camera image. Since the camera image is two-dimensional data, information obtained from the camera image is also limited to two-dimensional coordinates, luminance, color, and the like. In many of the conventional techniques, changed regions in a monitoring region are extracted using a luminance background subtraction scheme to recognize an object.

However, those many conventional techniques have a problem that when there is no difference in luminance between an object and a background, the object cannot be accurately recognized. In addition, there is a problem that since information about the distance of an object cannot be obtained with two-dimensional data obtained from a camera image, for example, when two objects are located with some distance therebetween in a Z-axis direction on three-dimensional coordinates, if the two objects are seen overlapping each other two-dimensionally, then it is recognized that they are in contact with each other and it is considered that there is one alarming target.

In view of this, for example, an intruder monitoring device disclosed in Patent Literature 1 creates a distance image in which distances to objects are pixels, from measurement results of a semiconductor laser, and creates a differential distance image which is differences obtained by comparing the distance image to be processed with a reference distance image. Then, the differential distance image is divided into a plurality of subframes, a binarized three-dimensional image is created from each subframe, a three-dimensional label image is created by performing three-dimensional labeling on the three-dimensional image, element points are grouped in the three-dimensional label image, and element points belonging to the same group are considered to correspond to the same object, by which each object is identified.

CITATION LIST

Patent Literature

Patent Literature 1: JP 2005-216160 A

SUMMARY OF INVENTION

Technical Problem

However, in a technique described in Patent Literature 1, the identification of objects is performed, as described above, by creating a three-dimensional label image by performing three-dimensionally extended labeling, using differences in distance. Identifying objects taking into account differences in distance using the three-dimensional labeling technique has a problem that the amount of computation per pixel is large and a limitation is imposed on processing time.

The invention is made to solve a problem such as that described above, and an object of the invention is to provide a monitoring device capable of identifying objects without performing three-dimensional labeling.

Solution to Problem

A monitoring device according to the invention includes: a current data computing unit for obtaining pieces of distance data representing distances to a plurality of physical objects present in a monitoring region, from measurement results obtained by a three-dimensional laser scanner, and using the distance data as current distance data, the three-dimensional laser scanner measuring the monitoring region; a comparison data computing unit for obtaining past distance data from the measurement results, and converting the past distance data into comparison distance data; a changed-region extracting unit for calculating difference values between the current distance data and the comparison distance data, and extracting changed regions whose difference values are greater than or equal to a threshold; a coordinate transforming unit for creating an image obtained by transforming a frontal viewpoint image such that a viewpoint of the three-dimensional laser scanner is moved, the frontal viewpoint image being based on the current distance data and the changed regions extracted by the changed-region extracting unit; and an object identifying unit for identifying the plurality of physical objects present in the monitoring region, on the basis of the frontal viewpoint image and the image created by the coordinate transforming unit.

Advantageous Effects of Invention

According to the invention, objects can be identified without performing three-dimensional labeling.

BRIEF DESCRIPTION OF DRAWINGS

FIG. 6 is diagrams describing current data to be accumulated in a current data accumulating unit by a current data computing unit in the first embodiment.

FIG. 7 is diagrams describing comparison data to be accumulated in a comparison data accumulating unit by a comparison data computing unit in the first embodiment.

FIG. 8 is diagrams showing, as an example, results obtained by a changed-region extracting unit calculating difference values by making a grid-by-grid comparison between the current data such as that shown in FIG. 6 and the comparison data such as that shown in FIG. 7 in the first embodiment.

DESCRIPTION OF EMBODIMENTS

To describe the invention in more detail, modes for carrying out the invention will be described below with reference to the accompanying drawings.

First Embodiment

Figure 1:
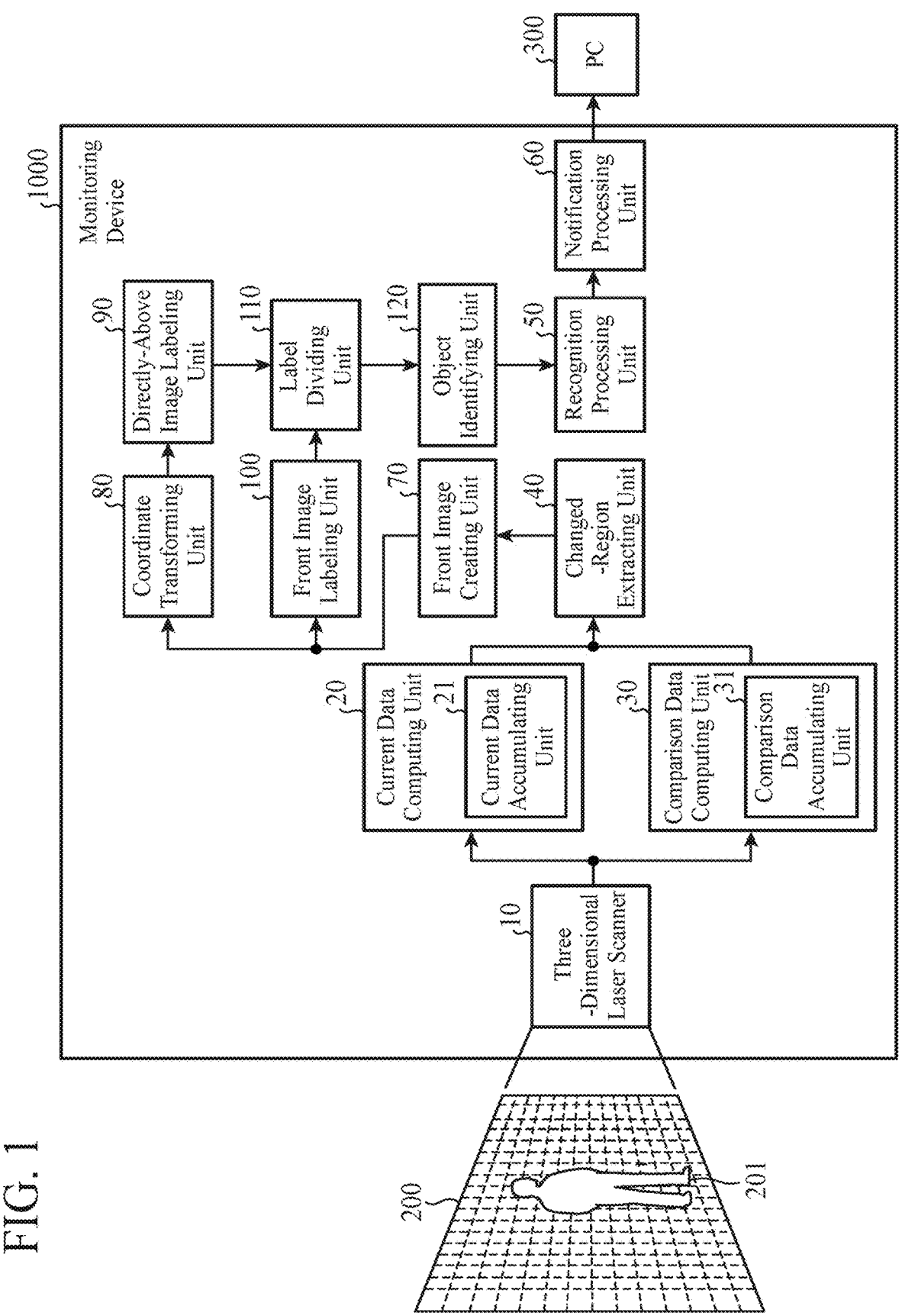
FIG. 1 is a block diagram showing a configuration of a monitoring device according to a first embodiment.

FIG. 1 is a block diagram showing a configuration of a monitoring device 1000 according to a first embodiment.

The monitoring device 1000 includes a three-dimensional laser scanner 10, a current data computing unit 20, a current data accumulating unit 21, a comparison data computing unit 30, a comparison data accumulating unit 31, a changed-region extracting unit 40, a recognition processing unit 50, a notification processing unit 60, a front image creating unit 70, a coordinate transforming unit 80, a directly-above image labeling unit 90, a front image labeling unit 100, a label dividing unit 110, and an object identifying unit 120.

In FIG. 1 there are shown, outside the monitoring device 1000, a background 200 indicating a scanning range of the three-dimensional laser scanner 10, an object 201 standing in front of the background 200, and a PC 300 which is a higher-level device of the monitoring device 1000 and performs an alarming process for a buzzer, etc. Note that although here the PC 300 is shown as an example of a higher-level device of the monitoring device 1000, a higher-level device of the monitoring device 1000 is not limited thereto and may be any device, e.g., an audio output device, as long as the device can perform an alarming process based on a notification process of the monitoring device 1000. The details of the notification process of the monitoring device 1000 will be described later.

Note that the background 200 is, as described above, the scanning range of the three-dimensional laser scanner 10 and a monitoring region to be subjected to monitoring by the monitoring device 1000. An image representing the monitoring region and seen from the viewpoint of the three-dimensional laser scanner 10 is divided into α vertical parts and β horizontal parts on the basis of the resolution of the three-dimensional laser scanner 10, and is thereby separated into individual small regions. In the first embodiment, the individual small regions are regions of an image divided on a pixel-by-pixel basis, the image being obtained by the three-dimensional laser scanner 10 scanning the monitoring region. In addition, the regions divided on a pixel-by-pixel basis are also referred to as grids in the first embodiment.

The three-dimensional laser scanner 10 obtains three-dimensional information of the object 201, etc., present in the scanning range and measures, for example, a distance to the object 201, etc.

Figure 2:
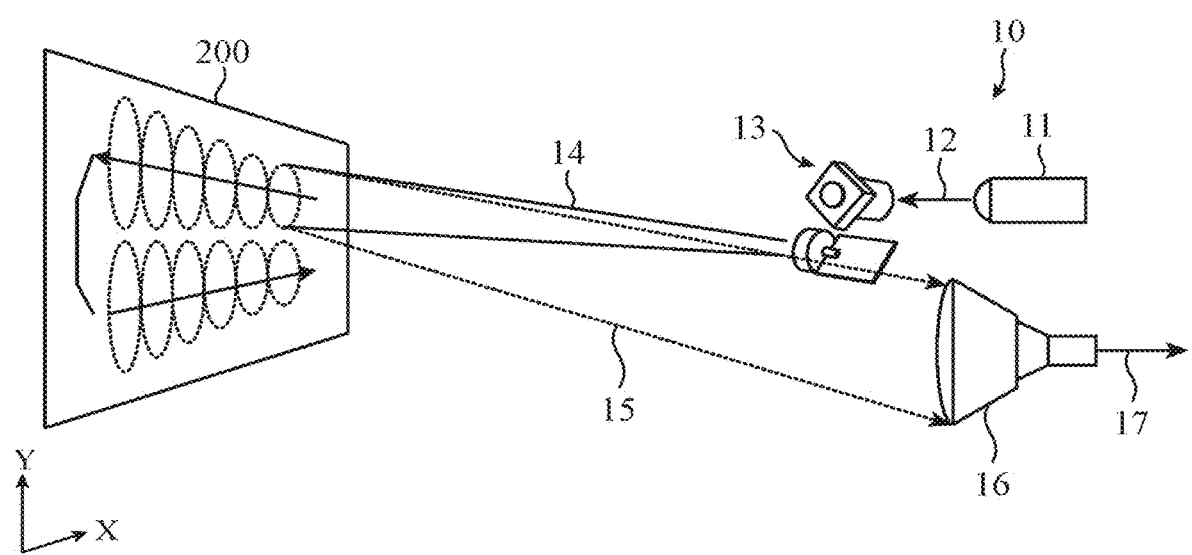
FIG. 2 is a diagram showing a configuration of a three-dimensional laser scanner.

FIG. 2 is a diagram showing a configuration of the three-dimensional laser scanner 10. As shown in FIG. 2, the three-dimensional laser scanner 10 includes therein a laser light emitting unit 11, a dispersion mechanism 13 using rotating mirrors, and a laser light receiving unit 16, and obtains distance data and intensity data by scanning a range represented by the background 200. The laser light emitting unit 11 irradiates with a laser light pulse 12.

The dispersion mechanism 13 is a mechanism for dispersing the laser light pulse 12 emitted from the laser light emitting unit 11 in a wide-angle range. An example of FIG. 2 shows the dispersion mechanism 13 using rotating mirrors. The details of the dispersion mechanism 13 using rotating mirrors will be described later. Dispersed laser light pulses 14 which are dispersed by the dispersion mechanism 13 are irradiated and reflected by the background 200 or an object (not shown in FIG. 2), forming reflected laser light 15. The example of FIG. 2 shows a state in which the dispersed laser light pulses 14 are sequentially dispersed and irradiated in an X-direction and a Y-direction of the background 200. Specifically, dispersion and irradiation are performed on twelve points in total, six points in the X-direction of the background 200 and two points in the Y-direction of the background 200.

Note that although in FIG. 2 the dispersion mechanism 13 using rotating mirrors is used, other dispersion mechanisms may be applied. For example, a scanless optical system that performs motorless mirror scanning may be used.

The laser light receiving unit 16 receives the reflected laser light 15 reflected by reflection targets, calculates distances to the reflection targets on the basis of a time difference between light emission and light reception, and uses the distances as distance data. In the example of FIG. 2, distances are individually calculated for all irradiation locations dispersed to twelve points in total, six points in the X-direction of the background 200 and two points in the Y-direction of the background 200, and are used as distance data. Furthermore, the laser light receiving unit 16 calculates, for all dispersed irradiation locations, a reflectance for each point which is a reflection target, on the basis of a ratio between the amount of light irradiated and the amount of light received, and uses the reflectances as intensity data. The distance data and intensity data calculated by the laser light receiving unit 16 are outputted to the current data computing unit 20 and the comparison data computing unit 30 shown in FIG. 1.

The distance data and intensity data for all irradiation locations which are calculated by the laser light receiving unit 16 are referred to as point group data 17.

The output, by the laser light receiving unit 16, of the point group data 17 to the current data computing unit 20 and the comparison data computing unit 30 is performed frame by frame. The laser light receiving unit 16 outputs point group data 17 obtained by scanning the entire background 200 once, i.e., in the example of FIG. 2, point group data 17 obtained by scanning a total of twelve points once, six points in the X-direction of the background 200 and two points in the Y-direction, as point group data 17 for one frame to the current data computing unit 20 and the comparison data computing unit 30.

Figure 3:
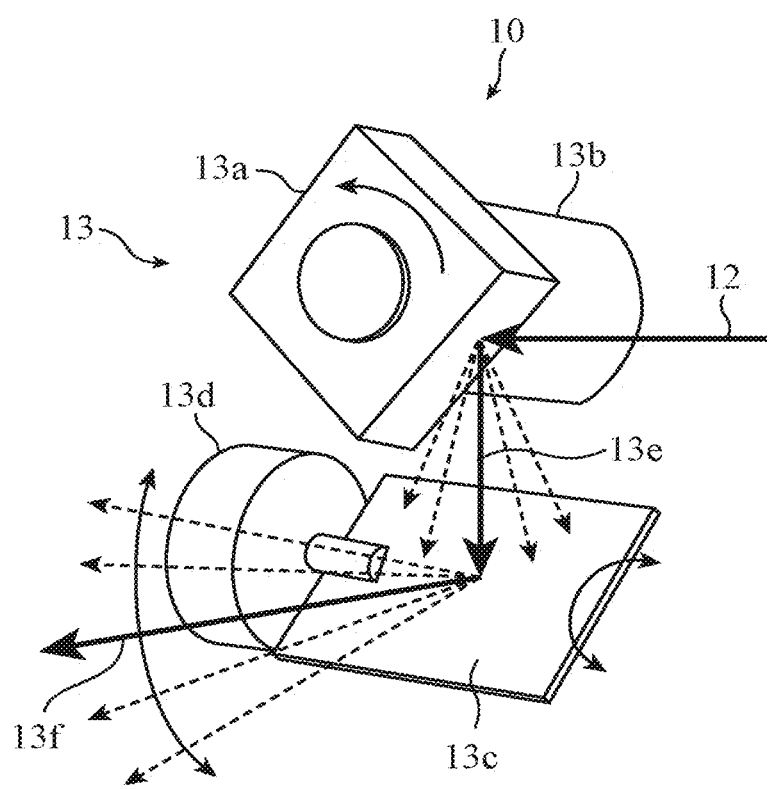
FIG. 3 is an illustrative diagram showing a dispersion mechanism of the three-dimensional laser scanner.

Next, the details of the dispersion mechanism 13 using rotating mirrors will be described with reference to FIG. 3. The dispersion mechanism 13 includes a first rotating mirror 13*a*, a first motor 13*b*, a second rotating mirror 13*c*, and a second motor 13*d*. The first rotating mirror 13*a* operates in synchronization with a pulse frequency of an incident laser light pulse 12, and disperses the laser light pulse 12 in a horizontal direction relative to a surface of the rotating mirror 13*a*. A horizontally dispersed laser light pulse 13*e* which is dispersed in the horizontal direction is always dispersed at the same angle. The first motor 13*b* is a drive source for driving the first rotating mirror 13*a*. The second rotating mirror 13*c* operates in synchronization with the pulse frequency of the incident laser light pulse 12, and further disperses the horizontally dispersed laser light pulse 13*e* in a vertical direction. A vertically dispersed laser light pulse 13*f* which is dispersed in the vertical direction is always dispersed at the same angle. The second motor 13*d* is a drive source for driving the second rotating mirror 13*c*.

By the above-described operation, the three-dimensional laser scanner 10 obtains X, Y, and Z three-dimensional information shown below.

X; horizontal direction coordinate
Y; vertical direction coordinate
Z; distance data In the example of FIG. 2, the horizontal direction coordinate X has six points and the vertical direction coordinate Y has two points. The distance data Z is information indicating the distance in a Z-axis direction. The distance data is hereinafter also referred to as Z-axis information.

Since three-dimensional information includes Z-axis information, even when an object has moved in the Z-axis direction on the three-dimensional coordinates, i.e., even when the object has moved straight ahead toward the three-dimensional laser scanner 10, by taking differences between pieces of Z-axis information obtained before and after the movement of the object, respectively, the amount of movement in the Z-axis direction of the object can be obtained. In addition, even when a plurality of objects are located with some distance therebetween in the Z-axis direction on the three-dimensional coordinates, by taking differences between pieces of Z-axis information, a distance in the Z-axis direction between the objects can be obtained.

The current data computing unit 20 obtains the distance data included in the point group data 17 outputted from the three-dimensional laser scanner 10, and accumulates the distance data in the current data accumulating unit 21, as current data representing distance data at the present time about the monitoring region, i.e., the scanning range of the three-dimensional laser scanner 10. Here, the current data computing unit 20 accumulates the inputted distance data in the current data accumulating unit 21 such that the distance data is associated with information indicating each grid.

The comparison data computing unit 30 obtains the distance data included in the point group data 17 outputted from the three-dimensional laser scanner 10, converts the distance data into comparison data, and accumulates the comparison data in the comparison data accumulating unit 31. A process of conversion into comparison data is performed, for example, by obtaining average distance data from distance data for the last 50 frames going back from the obtained distance data, and using the average distance data as comparison data, or by obtaining distance data for an immediately preceding frame of the inputted distance data and using the obtained distance data as comparison data. Note that the comparison data computing unit 30 accumulates distance data obtained from the three-dimensional laser scanner 10 in a data accumulating unit (not shown), and obtains distance data going back to the past on the basis of the accumulated distance data. The comparison data computing unit 30 accumulates the distance data serving as comparison data in the comparison data accumulating unit 31 such that the distance data is associated with information indicating each grid.

Note that in the first embodiment the current data is also referred to as current distance data, and the comparison data is also referred to as comparison distance data.

The changed-region extracting unit 40 obtains the current data accumulated in the current data accumulating unit 21 and the comparison data accumulated in the comparison data accumulating unit 31, calculates difference values by making a grid-by-grid comparison between the current data and the comparison data, and extracts pixel regions whose calculated difference values are greater than or equal to a preset threshold, as changed regions. In general, the changed regions are handled such that a certain threshold is set and data is converted into binarized data which is binarized by whether a difference value is greater than or equal to the threshold.

Note that since the current data and the comparison data are composed of distance data, a difference value calculated by the changed-region extracting unit 40 indicates a "difference in distance". For example, when the current data includes a background 200 and an object 201 and the comparison data includes only the background 200, a difference value to be obtained indicates a "distance between the background and the object".

Here, a changed region extracted by the changed-region extracting unit 40 will be described.

First, current data and comparison data, a comparison of which is made by the changed-region extracting unit 40, will be described.

Figure 4:
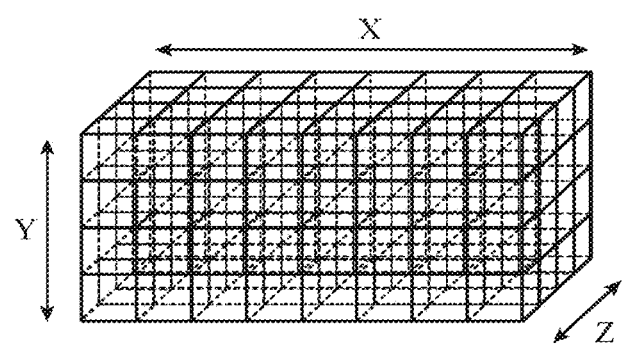
FIG. 4 is a diagram showing an example of a three-dimensional model representing a monitoring region scanned by the three-dimensional laser scanner, as a virtual three-dimensional space in the first embodiment.

FIG. 4 is a diagram showing an example of a three-dimensional model representing a monitoring region scanned by the three-dimensional laser scanner 10, as a virtual three-dimensional space in the first embodiment. Namely, FIG. 4 is a diagram showing an example of a three-dimensional model in which grids in the field of view of the three-dimensional laser scanner 10 which are represented two-dimensionally are built as a virtual three-dimensional space in the first embodiment.

FIG. 4 shows a three-dimensional model in which the virtual three-dimensional space representing a monitoring region is divided into 8×4×4 cubes. Each cube represents a point or a region in the virtual three-dimensional space that can be measured by laser irradiation to one point.

FIG. 5 is diagrams showing, as an example, how a floor 303, a target A 301, and a target B 302 present in the monitoring region are seen in the three-dimensional model divided into 8×4×4 cubes in the first embodiment. Individual objects such as the target A 301 and the target B 302 are hereinafter also collectively referred to as objects 201.

Figure 5A:
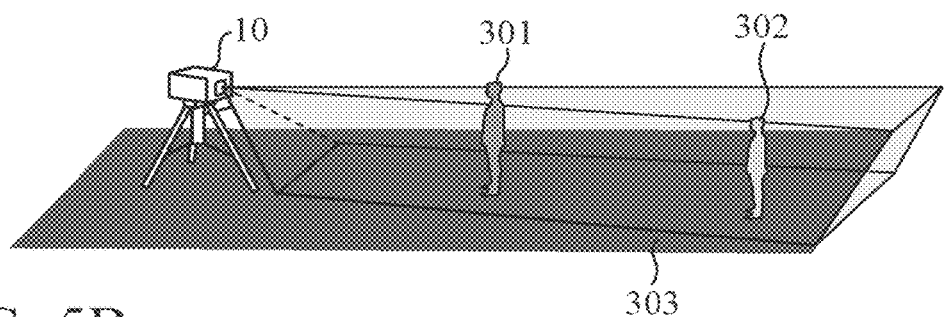
FIG. 5 is diagrams showing, as an example, how a floor, a target A, and a target B present in the monitoring region are seen in a three-dimensional model divided into 8×4×4 cubes in the first embodiment.
Figure 5B:
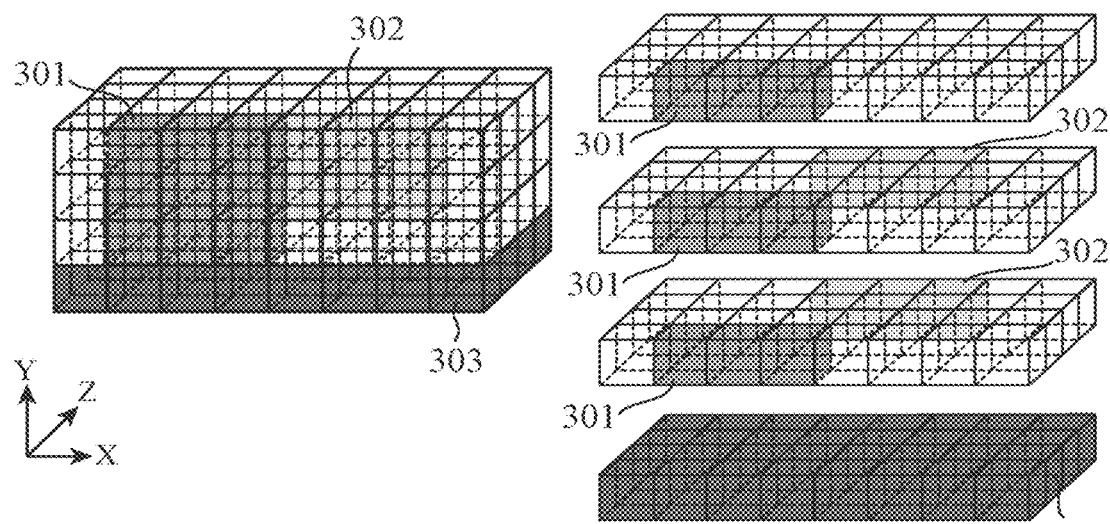
Figure 5C:
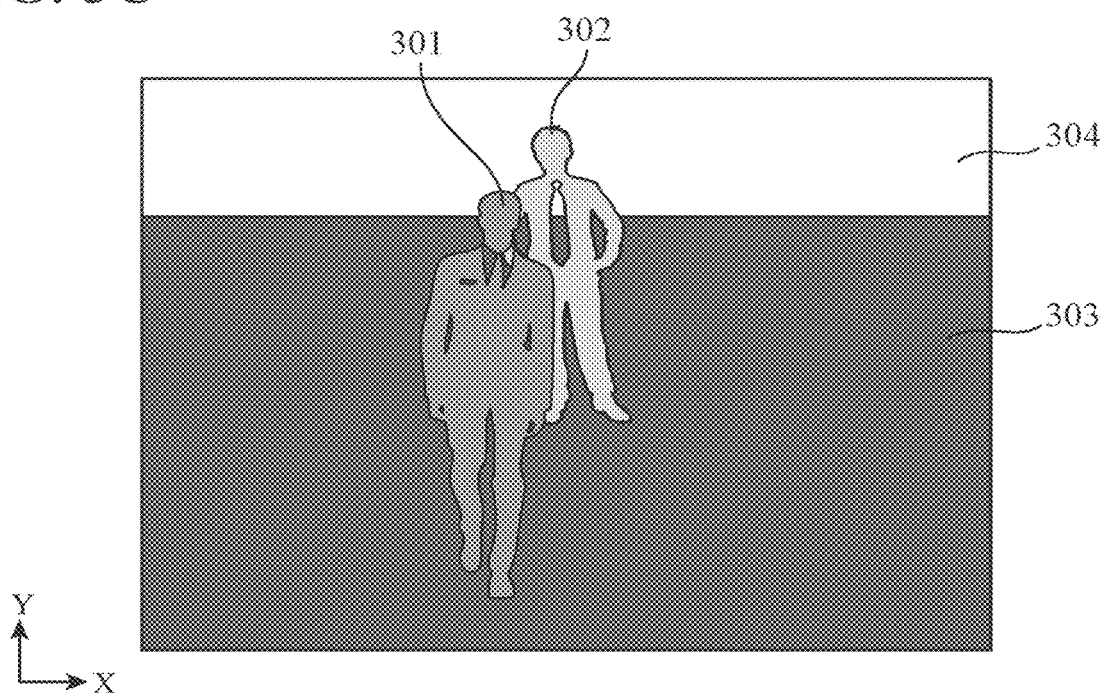

FIG. 5A is an image diagram showing a positional relationship between the three-dimensional laser scanner 10, and the target A 301 and the target B 302 as viewed from the side. In addition, FIG. 5B shows, on the left side thereof, a three-dimensional model in which the 8×4×4 cubes are joined together, and shows, on the right side thereof, three-dimensional models obtained by horizontally slicing the three-dimensional model in which the 8×4×4 cubes are joined together and which is shown on the left side thereof, into four parts so that all cubes can be seen. In addition, FIG. 5C is an image diagram of an image obtained by the three-dimensional laser scanner 10 scanning the monitoring region.

Note that in the first embodiment it is premised that, as shown in FIG. 5A, a plurality of objects 201 are present in the monitoring region, the plurality of objects 201 are located with some distance therebetween in the monitoring region, and the plurality of objects 201 are seen overlapping each other at least partially in an image as viewed from the viewpoint of the three-dimensional laser scanner 10.

Although FIG. 5 shows an example in which two objects 201, the target A 301 and the target B 302, are present, the objects 201 are not limited thereto and there may be three or more objects 201.

In FIGS. 5A and 5B, those cubes other than cubes corresponding to the floor 303, the target A 301, and the target B 302 are cubes whose distance data has not been able to be obtained by the three-dimensional laser scanner 10.

In addition, in FIG. 5C, those grids other than grids corresponding to the floor 303, the target A 301, and the target B 302 in the image obtained by the three-dimensional laser scanner 10 scanning the monitoring region are grids whose distance data has not been able to be obtained by the three-dimensional laser scanner 10. In the first embodiment, grids whose distance data has not been able to be obtained by the three-dimensional laser scanner 10 are also referred to as blank grids 304.

As shown in FIG. 5C, due to the angle of depression of the three-dimensional laser scanner 10, each portion of the floor 303 is seen in a higher position in the image as the portion is located farther away in the Z-axis direction from the three-dimensional laser scanner 10. In addition, despite the fact that the target A 301 and the target B 302 are apart from each other in distance in the Z-axis direction, the target A 301 and the target B 302 are seen overlapping each other in the image obtained by the three-dimensional laser scanner 10 scanning the monitoring region.

Figure 6A:
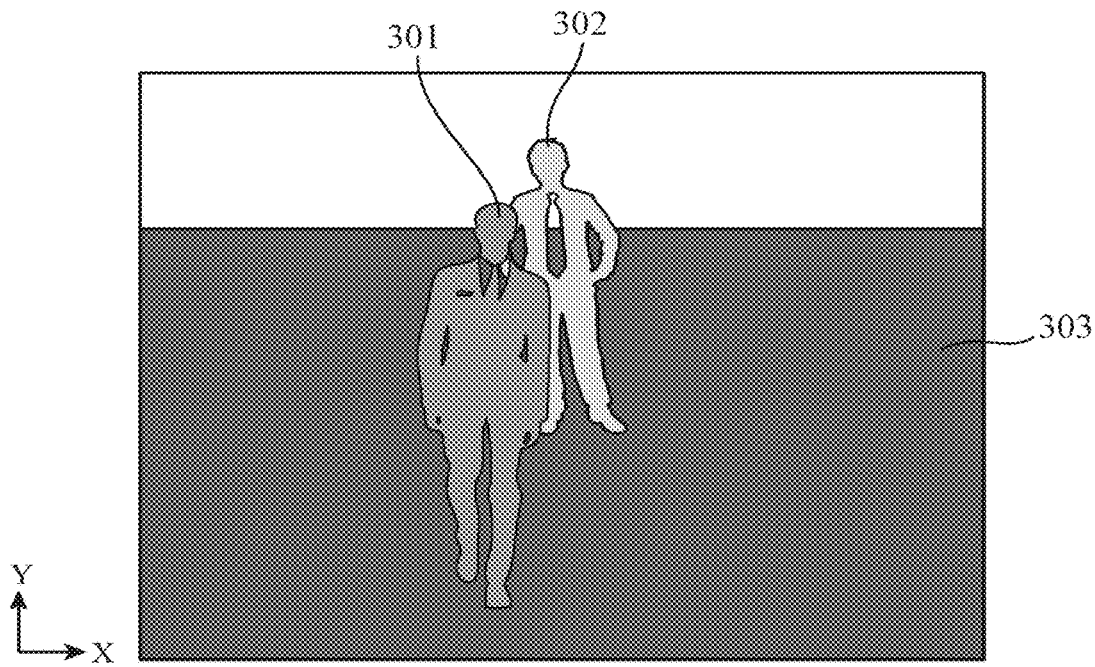
FIG. 6A is an image diagram of an image represented by current data and FIG. 6B is a diagram showing an example in which the image diagram of the image represented by the current data in FIG. 6A is divided into grids, and numbers represented by the current data are additionally noted.
Figure 6B:
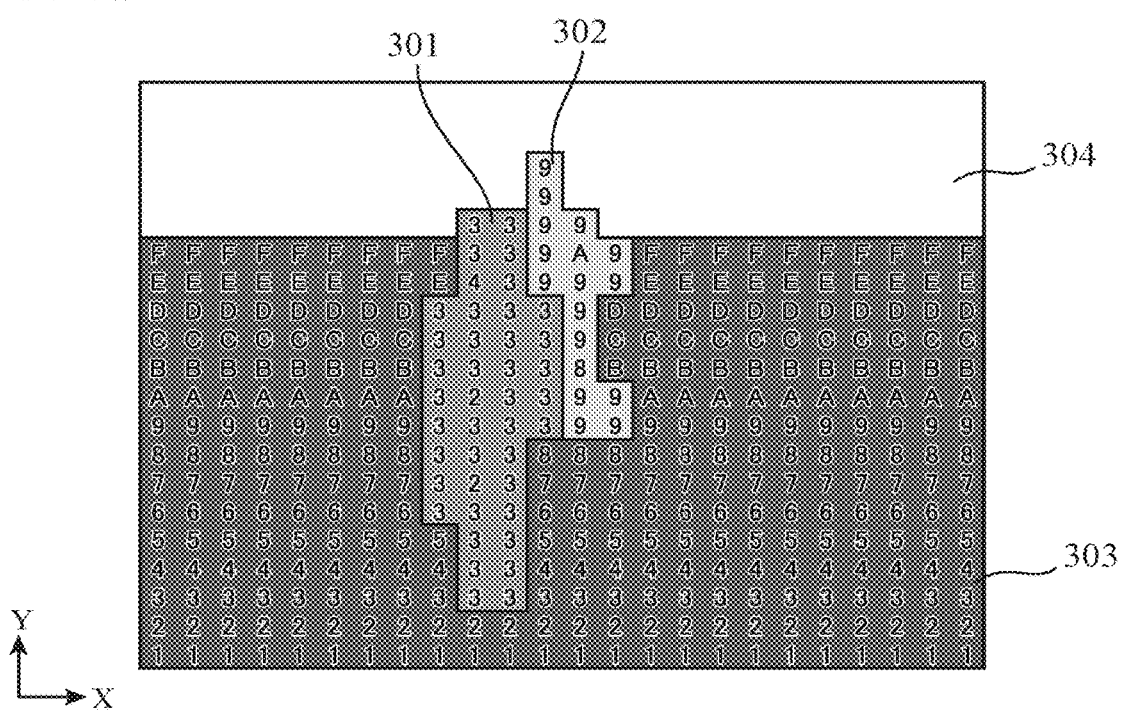

FIG. 6 is a diagram describing current data to be accumulated in the current data accumulating unit 21 by the current data computing unit 20 in the first embodiment. FIG. 6A is an image diagram of an image represented by current data. FIG. 6B is a diagram showing an example in which the image diagram of the image represented by the current data in FIG. 6A is divided into grids, and numbers represented by the current data are additionally noted.

In FIG. 6B, the image obtained by the three-dimensional laser scanner 10 scanning the monitoring region is divided into 19 grids in the Y-axis direction×24 grids in the X-axis direction.

In FIG. 6B, the numbers represented by the current data indicate distances from the three-dimensional laser scanner 10. Note that in FIG. 6B, as an example, the distances from the three-dimensional laser scanner 10 are in a range of 0 to 15 m, and are represented by 0 to F. The units of the distances represented by 0 to F are meter.

FIG. 6B shows that the current data of the target A 301 is made up of data in a range of 3 m±1 m, and the target A 301 is present in a position whose distance from the three-dimensional laser scanner 10 is about 3 m. In addition, FIG. 6B shows that the current data of the target B 302 is made up of data in a range of 9 m±1 m, and the target B 302 is present in a position whose distance from the three-dimensional laser scanner 10 is about 9 m. Note, however, that both are changeable values that change when the target A 301 or the target B 302 moves in the Z-axis direction.

In addition, in FIG. 6B, the floor 303 is spread uniformly in a range of 1 to 15 m.

Note that in FIG. 6B the blank grids 304 indicate pixels whose distance data has not been able to be obtained, and are handled in subsequent computation assuming that they have the distance "F".

Figure 7A:
FIG. 7A is an image diagram of an image represented by comparison data and FIG. 7B is a diagram showing an example in which the image diagram of the image represented by the comparison data in FIG. 7A is divided into grids, and numbers represented by the comparison data are additionally noted.
Figure 7B:
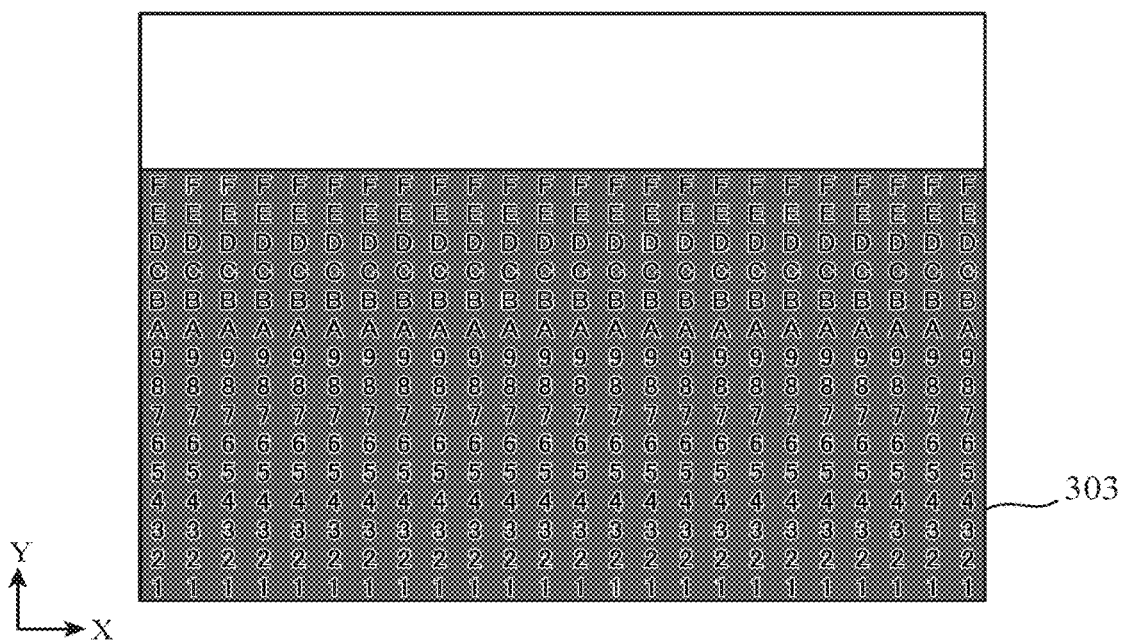

FIG. 7 is diagrams describing comparison data to be accumulated in the comparison data accumulating unit 31 by the comparison data computing unit 30 in the first embodiment. FIG. 7A is an image diagram of an image represented by comparison data, and FIG. 7B is a diagram showing an example in which the image diagram of the image represented by the comparison data in FIG. 7A is divided into grids, and numbers represented by the comparison data are additionally noted.

In FIG. 7B, the numbers represented by the comparison data indicate distances from the three-dimensional laser scanner 10. Note that in FIG. 7B, as an example, the distances from the three-dimensional laser scanner 10 are in a range of 0 to 15 m, and are represented by 0 to F. The units of the distances represented by 0 to F are meter.

Since the target A 301 and the target B 302 are moving objects 201, when the comparison data computing unit 30 generates comparison data, the comparison data computing unit 30 deletes the target A 301 and the target B 302 by comparison data generation logic, and generates comparison data as data representing only the floor 303 whose values of distance data are stable, as shown in FIG. 7B.

In addition, in FIG. 7B, the floor 303 is spread uniformly in a range of 1 to 15 m.

The changed-region extracting unit 40 calculates difference values by making a grid-by-grid comparison between the current data such as that shown in FIG. 6 and the comparison data such as that shown in FIG. 7, and extracts pixel regions whose calculated difference values are greater than or equal to a preset threshold, as changed regions.

Figure 8A:
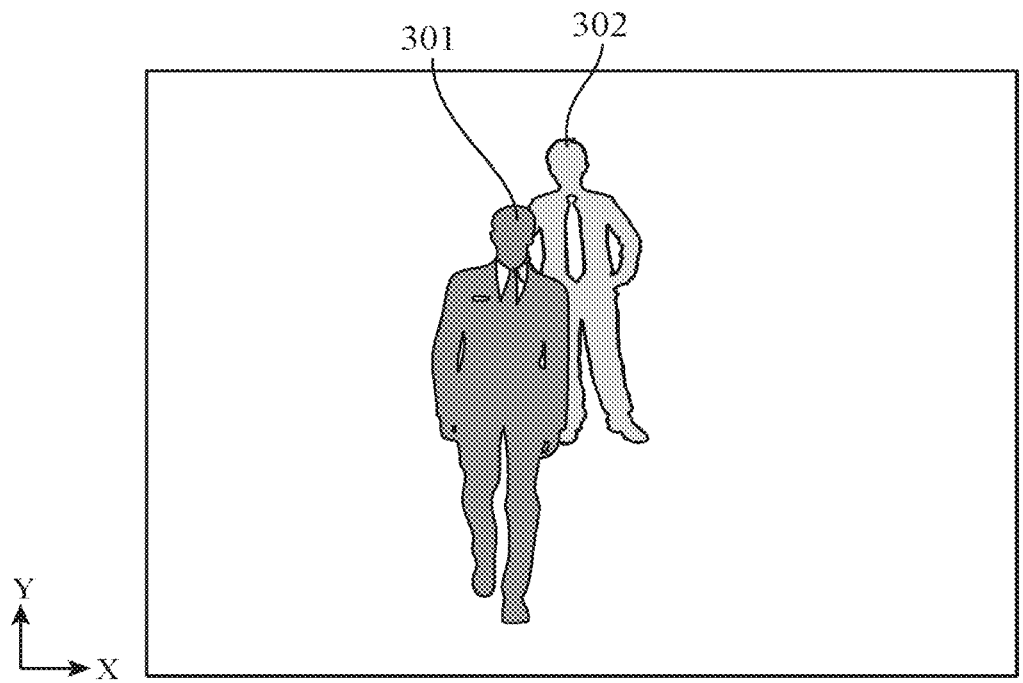
FIG. 8A is an image diagram showing an image obtained as a result of calculating difference values between the current data such as that shown in FIG. 6B and the comparison data such as that shown in FIG. 7B.
Figure 8B:
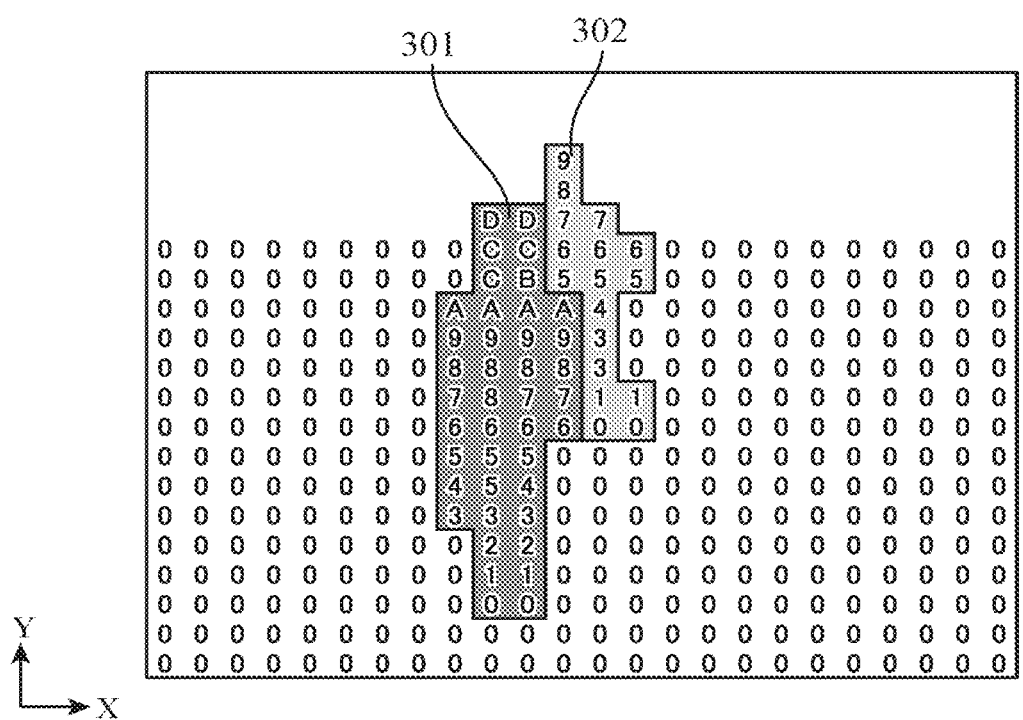
FIG. 8B is a diagram showing results obtained by calculating difference values between the current data such as that shown in FIG. 6B and the comparison data such as that shown in FIG. 7B.

FIG. 8 is a diagram showing, as an example, results obtained by the changed-region extracting unit 40 calculating difference values by making a grid-by-grid comparison between the current data such as that shown in FIG. 6 and the comparison data such as that shown in FIG. 7 in the first embodiment. FIG. 8A is an image diagram showing an image obtained as a result of calculating difference values between the current data such as that shown in FIG. 6B and the comparison data such as that shown in FIG. 7B. FIG. 8B is a diagram showing results obtained by calculating difference values between the current data such as that shown in FIG. 6B and the comparison data such as that shown in FIG. 7B.

In FIG. 8B, each grid is shown with an absolute value of a difference value between current data and comparison data additionally noted. Namely, numbers additionally noted in FIG. 8B indicate differences in distance between the current data and the comparison data.

Note that in FIG. 8B, too, the distances from the three-dimensional laser scanner 10 are in a range of 0 to 15 m, and are represented by 0 to F. The units of the distances represented by 0 to F are meter.

Figure 9:
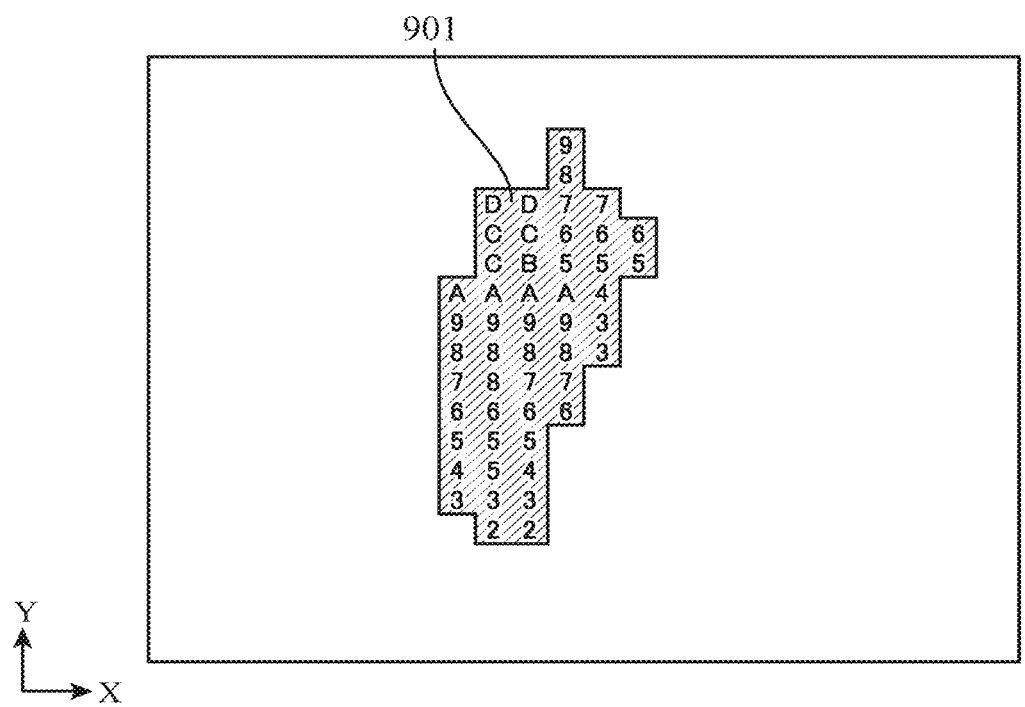
FIG. 9 is a diagram showing results obtained by the changed-region extracting unit extracting, after calculating the difference values as shown in FIG. 8, changed regions on the basis of the difference values in the first embodiment.

FIG. 9 is a diagram showing results obtained by the changed-region extracting unit 40 extracting, after calculating the difference values as shown in FIG. 8, changed regions based on the difference values in the first embodiment.

In addition, in the first embodiment, as an example, when in each grid the difference value between current data and comparison data is greater than or equal to "2", the changed-region extracting unit 40 extracts the grid as a changed region.

In FIG. 9, grids extracted as changed regions by the changed-region extracting unit 40 are indicated as changed regions 901.

Note that in FIG. 9 each grid included in the changed regions 901 is additionally noted with a difference value between current data and comparison data, as a number, as in FIG. 8B.

As described above, the changed-region extracting unit 40 obtains current data accumulated in the current data accumulating unit 21 and comparison data accumulated in the comparison data accumulating unit 31, calculates difference values by making a grid-by-grid comparison between the current data and the comparison data, and extracts pixel regions whose calculated difference values are greater than or equal to the preset threshold, as changed regions.

The changed-region extracting unit 40 outputs information on the extracted changed regions to the front image creating unit 70.

The description returns to the monitoring device 1000 using FIG. 1.

The front image creating unit 70 creates, on the basis of the information on changed regions outputted from the changed-region extracting unit 40, a frontal viewpoint image in which the changed regions are represented by pixel regions in the image showing the monitoring region. Specifically, on the basis of the information on the changed regions outputted from the changed-region extracting unit 40, the front image creating unit 70 extracts only grids corresponding to the changed regions from grids in the image represented by the current data, and creates a frontal viewpoint image including only the extracted grids. A visualized image of the frontal viewpoint image is one similar to that shown in FIG. 9. Note, however, that although the numbers additionally noted in FIG. 9 are difference values between the current data and the comparison data, the frontal viewpoint image is an image based on the current data, and thus, it should be noted that if numbers are to be additionally noted, the numbers are those represented by the current data.

The front image creating unit 70 outputs information on the frontal viewpoint image to the coordinate transforming unit 80 and the front image labeling unit 100.

Note that in the first embodiment, as described above, the monitoring device 1000 includes the front image creating unit 70, and the front image creating unit 70 creates the frontal viewpoint image on the basis of the information on the changed regions outputted from the changed-region extracting unit 40. However, instead of the monitoring device 1000 including the front image creating unit 70, on the basis of current data and information on changed regions extracted by the changed-region extracting unit 40, the coordinate transforming unit 80 and the front image labeling unit 100 which will be described later may regard a combination of the current data and the information on changed regions to be a frontal viewpoint image. In that case, for example, the changed-region extracting unit 40 outputs current data and information on changed regions to the coordinate transforming unit 80 and the front a labeling unit 100.

The coordinate transforming unit 80 and the front image labeling unit 100 use a combination of the current data and information on changed regions outputted from the changed-region extracting unit 40, as a frontal viewpoint image, and perform processes which will be described later.

The coordinate transforming unit 80 creates, on the basis of the information on the frontal viewpoint image outputted from the front image creating unit 70, an image in which the viewpoint of the frontal viewpoint image is moved.

Figure 10:
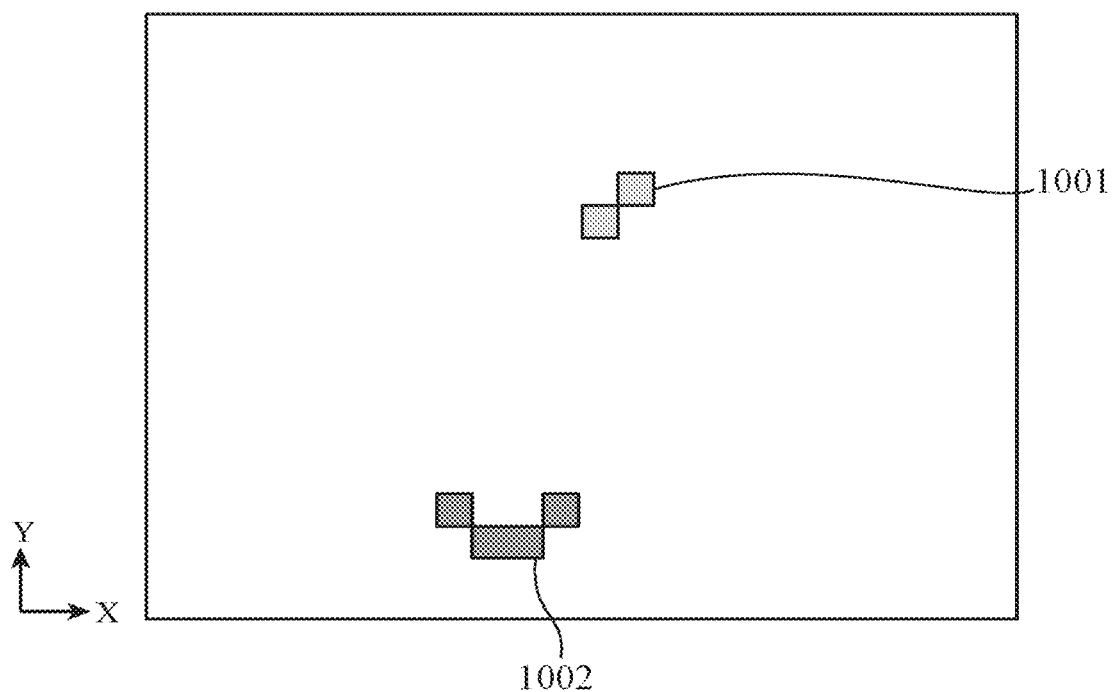
FIG. 10 is a diagram showing an image of a directly-above viewpoint image which is results obtained by a coordinate transforming unit performing a coordinate transformation from a frontal viewpoint image to a directly-above viewpoint image in the first embodiment.

FIG. 10 is a diagram showing an image of a directly-above viewpoint image which is results obtained by the coordinate transforming unit 80 performing a coordinate transformation from a frontal viewpoint image to a directly-above viewpoint image in the first embodiment.

The coordinate transforming unit 80 performs a coordinate transformation on a frontal viewpoint image, with the depth direction of the frontal viewpoint image being the Y-axis direction and the X-axis direction of the frontal viewpoint image keeping as the X-axis direction. Note that the depth direction of the frontal viewpoint image corresponds to the Z-axis direction of the monitoring region. Specifically, for example, since the target A 301 is present in a position about 3 m from the three-dimensional laser scanner 10 and the target B 302 is present in a position about 9 m from the three-dimensional laser scanner 10 (see FIG. 6), the coordinate transforming unit 80 re-projects the changed regions such that a distance of 3 m to the target A 301 and a distance of 9 m to the target B 302 from the three-dimensional laser scanner 10 each are a coordinate on the Y-axis, and the current coordinate on the X-axis keeps as it is. Namely, the coordinate transformation by the coordinate transforming unit 80 referred to in the first embodiment is the exchange of Z-axis information and Y-axis information in the distance data included in the point group data 17.

As a result, pixel regions shown in an image of a picture such as that shown in FIG. 10 are created. In the first embodiment, the pixel regions created by the coordinate transforming unit 80 performing a coordinate transformation on changed regions such as those shown in FIG. 10 are also referred to as transformed changed regions, and an image showing the transformed changed regions such as that shown in FIG. 10 is also referred to as a directly-above viewpoint image. That is, in the first embodiment, the directly-above viewpoint image is an image obtained by transforming a frontal viewpoint image created by the front image creating unit 70, such that the viewpoint of the three-dimensional laser scanner 10 is moved to a viewpoint in a right-above direction.

In the directly-above viewpoint image, as shown in FIG. 10, for transformed changed regions (see 1002 of FIG. 10) indicating the target A 301 and transformed changed regions (see 1001 of FIG. 10) indicating the target B 302, grids included in the target A 301 and the target B 302 are arranged separated from each other so that the difference in distance between the target A 301 and the target B 302 can be seen.

The coordinate transforming unit 80 outputs information on the directly-above viewpoint image showing the transformed changed regions to the directly-above image labeling unit 90.

The directly-above image labeling unit 90 performs labeling on the respective grids included in the transformed changed regions, on the basis of the information on the directly-above viewpoint image showing the transformed changed regions which is outputted from the coordinate transforming unit 80.

The front image labeling unit 100 performs labeling on the respective grids included in the changed regions, on the basis of the information of the frontal viewpoint image showing the changed regions which is outputted from the front image creating unit 70.

The changed regions and the transformed changed regions which are shown in the frontal viewpoint image and the directly-above viewpoint image are, as described above, regions based on regions that include grids whose difference values between the current data and the comparison data are greater than or equal to the threshold and that are extracted by the changed-region extracting unit 40. Note, however, that in the directly-above viewpoint image and the frontal viewpoint image, the grids in the regions are independent of each other.

However, changed regions and transformed changed regions essentially occur for the target A 301 or the target B 302 which is an object 201 present in the field of view of the three-dimensional laser scanner 10. Thus, although grids in the changed regions and the transformed changed regions are independent of each other, each grid essentially belongs to either one of the target A 301 and the target B 302.

Hence, for the grids included in the transformed changed regions shown in the directly-above viewpoint image, the directly-above image labeling unit 90 determines grids belonging to the same object 201, puts the grids together into one aggregate, and assigns labels on an aggregate-by-aggregate basis.

In addition, for the grids included in the changed regions shown in the frontal viewpoint image, the front image labeling unit 100 determines grids belonging to the same object 201, puts the grids together into one aggregate, and assigns labels on an aggregate-by-aggregate basis.

This operation of putting grids together into one aggregate and assigning labels on an aggregate-by-aggregate basis by the directly-above image labeling unit 90 and the front image labeling unit 100 is referred to as labeling in the first embodiment.

Specifically, the directly-above image labeling unit 90 and the front image labeling unit 100 determine grids belonging to the same object 201 among the grids in the transformed changed regions and the changed regions, and assign the same label number to the grids determined to belong to the same object 201. When there are a plurality of objects 201, different label numbers are assigned to the objects 201, respectively.

Now, the operation of labeling performed by the directly-above image labeling unit 90 and the front image labeling unit 100 will be described in detail.

Note that since the labeling performed by the directly-above image labeling unit 90 and the front image labeling unit 100 is labeling performed on grids in an image, in order to distinguish the labeling from labeling operation in a three-dimensional space which will be described later, the labeling is particularly referred to as two-dimensional labeling. Labeling in a three-dimensional space which will be described later is referred to as three-dimensional labeling.

FIG. 11 is diagrams describing an example of a procedure of the operation of labeling performed by the front image labeling unit 100 in the first embodiment.

Here, description of labeling operation will be made using FIG. 11 as an example of a procedure of the operation of labeling performed by the front image labeling unit 100. A procedure of the operation of labeling performed by the directly-above image labeling unit 90 is also the same as the procedure of labeling operation performed by the front image labeling unit 100, and the only difference therebetween is whether labeling targets are grids included in changed regions or grids included in transformed changed regions. Thus, a detailed description of the operation of labeling performed by the directly-above image labeling unit 90 is omitted.

In FIG. 11, grids represented by black squares show an example of grids included in changed regions shown in a frontal viewpoint image which is created by the front image creating unit 70 on the basis of information on changed regions extracted by the changed-region extracting unit 40.

FIG. 11 shows an example in which grids in changed regions are arranged for simplification of description for the operation of labeling. Note that the example shown in FIG. 11 is an example of different changed regions 901 than those in the example shown in FIG. 9.

Figure 11I:
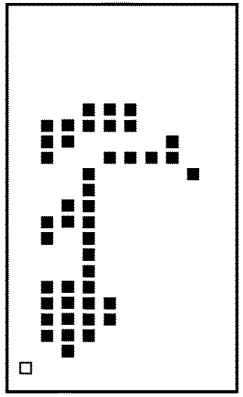
FIG. 11 is diagrams describing an example of a procedure of the operation of labeling performed by a front image labeling unit in the first embodiment.
Figure 11J:
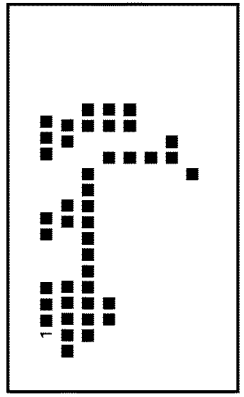
Figure 11K:
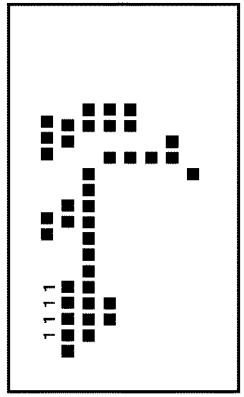
Figure 11L:
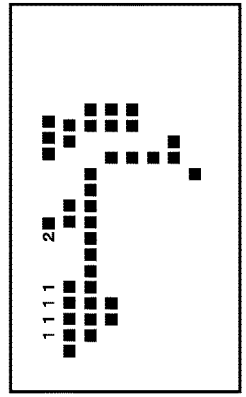
Figure 11E:
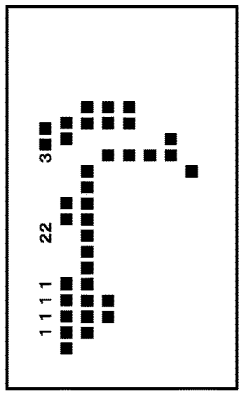
Figure 11F:
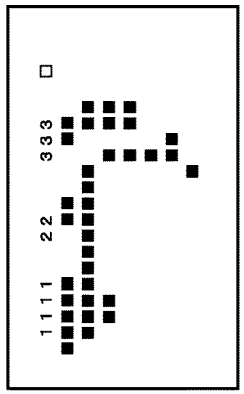
Figure 11G:
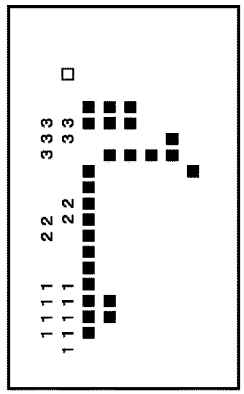
Figure 11H:
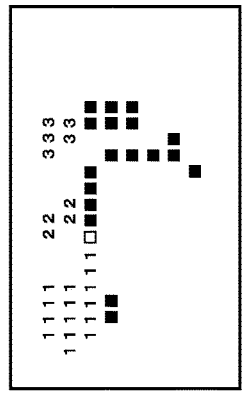
Figure 11A:
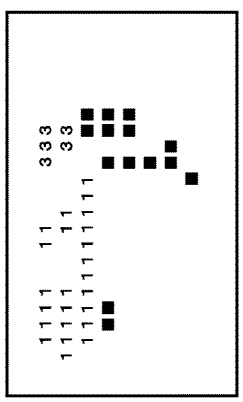

The front image labeling unit 100 searches for a grid in a changed region from the upper left corner of the frontal viewpoint image, and starts a raster scan (see FIG. 11A). Note that in FIG. 11A a search portion to be subjected to a raster scan is represented by a white square.

A raster scan performed by the front image labeling unit 100 is a generic existing raster scan and thus a detailed description thereof is omitted.

Figure 11B:
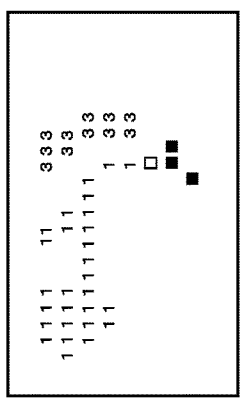

When the front image labeling unit 100 finds the first grid in a changed region, the front image labeling unit 100 assigns the label "1" to the encountered grid (see FIG. 11B).

The front image labeling unit 100 subsequently continues the raster scan. Then, when a newly found grid in a changed region is adjacent to a grid already assigned a label number, the front image labeling unit 100 assigns the same label number as that already assigned, to the found grid (see FIG. 11C). The adjacent grids are, for example, grids whose difference in X-coordinate and whose difference in Y-coordinate are both within ±1. Note that this is merely an example and the adjacent grids may be grids whose difference in X-coordinate and whose difference in Y-coordinate are both within ±2, and what range of grids are considered adjacent grids can be set in advance as appropriate.

Figure 11C:
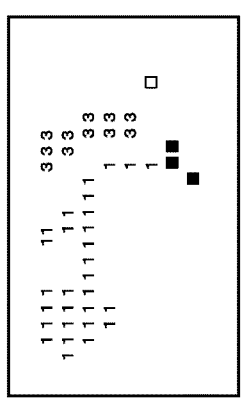

FIG. 11C shows a state in which since the front image labeling unit 100 has found a grid adjacent to a grid already assigned the label number "1", the front image labeling unit 100 has assigned the label "1" to the found grid.

The front image labeling unit 100 subsequently continues the raster scan. Then, when a newly found grid in a changed region is not adjacent to a grid already assigned a label number, the front image labeling unit 100 assigns a different label number than that already assigned, to the found grid (see FIG. 11D).

Figure 11D:
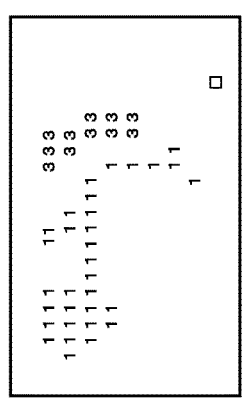

FIG. 11D shows a state in which since the front image labeling unit 100 has found a grid that is not adjacent to a grid already assigned the label number "1", the front image labeling unit 100 has assigned the label "2" to the found grid.

The front image labeling unit 100 subsequently continues the raster scan. Then, when a newly found grid in a changed region is, furthermore, not adjacent to a grid already assigned a label number, the front image labeling unit 100 assigns a different label number than those already assigned, to the found grid (see FIG. 11E).

FIG. 11E shows a state in which since the front image labeling unit 100 has found a grid that is not adjacent to any of grids already assigned the label number "1" or "2", the front image labeling unit 100 has assigned the label "3" to the found grid.

When the front image labeling unit 100 completes the raster scan for the first line, the front image labeling unit 100 transitions to a raster scan for the second line (see FIG. 11F).

The front image labeling unit 100 performs a raster scan for the second line, and assigns label numbers to girds in changed regions in the same manner as for the first line. Then, when the front image labeling unit 100 completes the raster scan for the second line, the front image labeling unit 100 transitions to a raster scan for the third line (see FIG. 11G).

It is assumed that the front image labeling unit 100 has determined that a newly found grid in a changed region is a grid adjacent to a plurality of grids already assigned different label numbers (see FIG. 11H).

FIG. 11H shows a state in which the front image labeling unit 100 has found a grid adjacent to both a grid already assigned the label number "1" and a grid already assigned the label number "2" during performance of the raster scan for the third line.

This case indicates that it has been found at this point in time that the grids assigned the label number "1" and the grids assigned the label number "2" both belong to the same object 201.

The front image labeling unit 100 assigns the same label number to the grids assigned the label number "1" and the grids assigned the label number "2" which have been found to belong to the same object 201. Specifically, the front image labeling unit 100 makes the same the label numbers to be "1" by changing the label numbers of the grids assigned the label number "2" to "1" (see FIG. 11I). Note that this is merely an example and, for example, the front image labeling unit 100 may change the label numbers of the grids assigned the label number "1" to "2". The configuration may be any as long as grids in changed regions having been found to belong to the same object 201 are assigned the same label number.

It is assumed that the front image labeling unit 100 has subsequently continued the raster scan and has transitioned to a raster scan for the sixth line. It is assumed that a grid in a changed region has been newly found in the sixth line, but it has been found that the grid is adjacent only to a grid already assigned a certain label number. For example, it is assumed that the newly found grid in the changed region is a grid adjacent only to a grid already assigned the label number "1".

In this case, the front image labeling unit 100 assigns the label number "1" to the newly found grid, and does not change the label numbers of grids already assigned label numbers, e.g., grids assigned the label number "3" (see FIGS. 11J to 11K).

The front image labeling unit 100 performs the operation of labeling by the procedure such as that described above. As a result, for example, labeling is performed on the grids included in the changed regions shown in the frontal viewpoint image having a state such as that shown in FIG. 11A, resulting in a state in which, as shown in FIG. 11L, the grids included in the changed regions are assigned the label number "1" and the label number "3".

Figure 12:
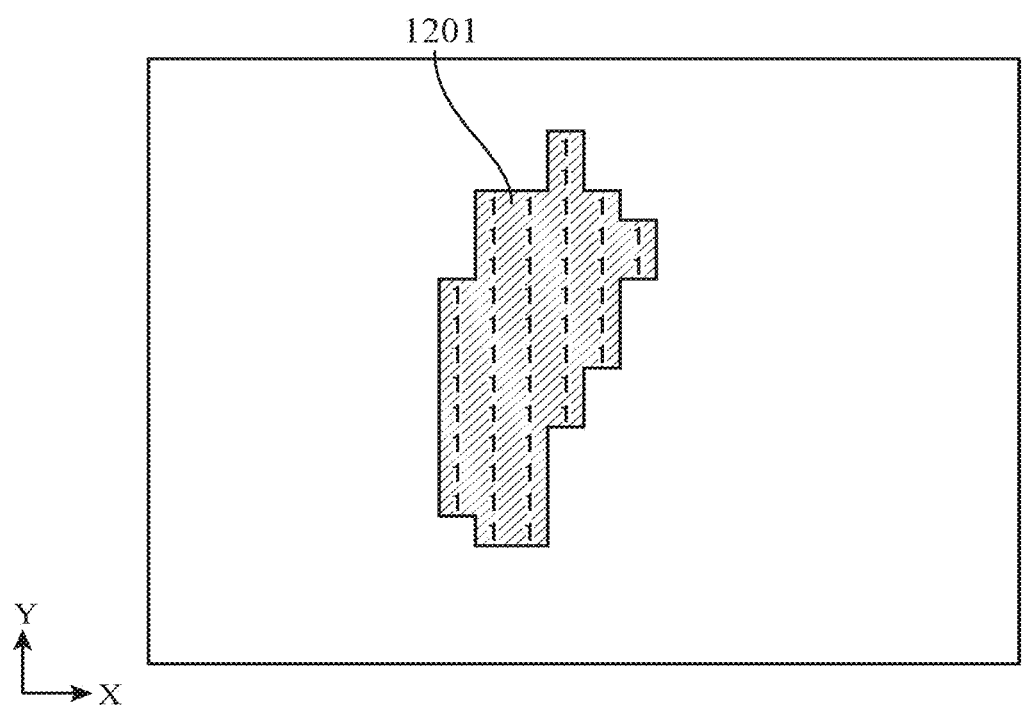
FIG. 12 is a diagram showing an example of results obtained by the front image labeling unit performing labeling on grids included in the changed regions shown in the frontal viewpoint image such as that shown in FIG. 9, according to the procedure of labeling such as that described using FIG. 11 in the first embodiment.

FIG. 12 is a diagram showing an example of results obtained by the front image labeling unit 100 performing labeling on grids included in the changed regions 901 shown in the frontal viewpoint image such as that shown in FIG. 9, according to the procedure of labeling such as that described using FIG. 11 in the first embodiment. Note that in FIG. 12 each grid having been subjected to labeling is additionally noted with an assigned label number.

As shown in FIG. 12, the grids extracted as the changed regions 901 are all assigned the same label number "1".

Although the grids extracted as the changed regions 901 include both grids included in the target A 301 and grids included in the target B 302, since a distinction therebetween cannot be made by two-dimensional labeling in the frontal viewpoint image, the front image labeling unit 100 assigns, for example, as shown in FIG. 12, the same label number to both of the grids included in the target A 301 and the grids included in the target B 302.

Figure 13:
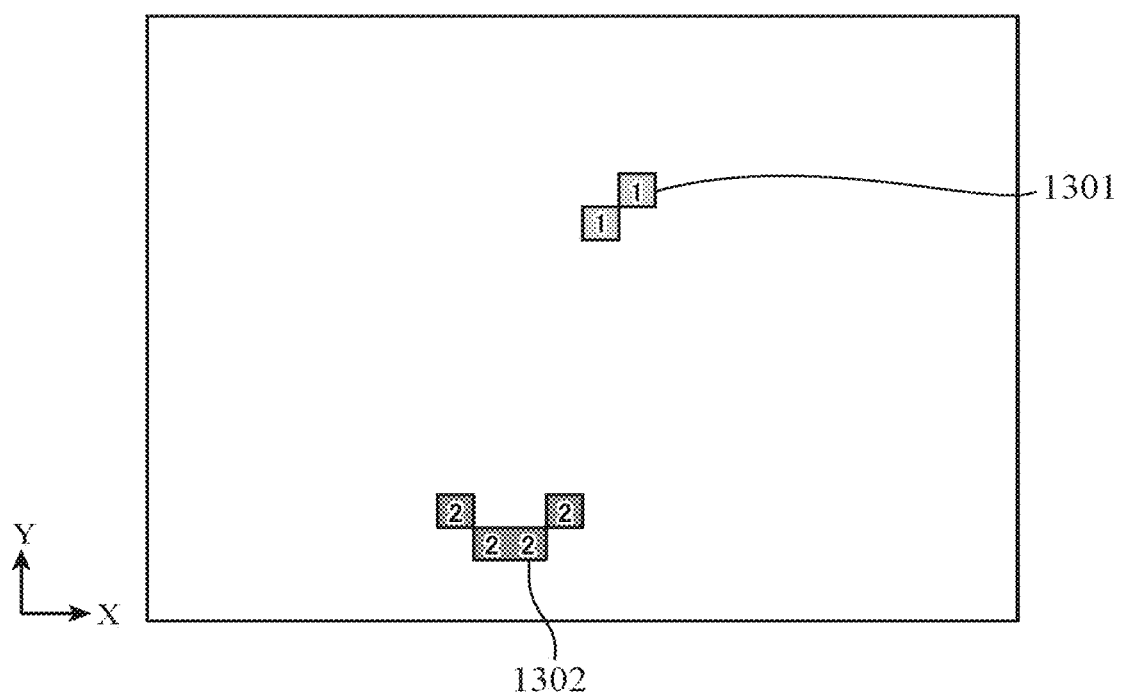
FIG. 13 is a diagram showing an example of results obtained by a directly-above image labeling unit performing labeling on grids included in transformed changed regions shown in the directly-above viewpoint image such as that shown in FIG. 10, according to the procedure of labeling such as that described using FIG. 11 in the first embodiment.

On the other hand, FIG. 13 is a diagram showing an example of results obtained by the directly-above image labeling unit 90 performing labeling on grids included in the transformed changed regions 1001 and 1002 shown in the directly-above viewpoint image such as that shown in FIG.

10, according to the procedure of labeling such as that described using FIG. 11 in the first embodiment. Note that in FIG. 13 each grid having been subjected to labeling is additionally noted with an assigned label number.

The labeling performed by the directly-above image labeling unit 90 is also two-dimensional labeling as with the labeling performed by the front image labeling unit 100, but the target of the two-dimensional labeling is a directly-above viewpoint image. In the directly-above viewpoint image, as described above, grids included in a plurality of objects 201 are arranged separated from each other so that the difference in distance between the objects 201 can be seen. Specifically, as shown in FIG. 10, grids included in the transformed changed regions 1002 representing the target A 301 and grids included in the transformed changed regions 1001 representing the target B 302 are arranged separated from each other.

Therefore, for example, as shown in FIG. 13, the directly-above image labeling unit 90 assigns the label number "1" to the grids included in the transformed changed regions (see 1301 of FIG. 13) representing the target B 302, and assigns the label number "2" to the grids in the transformed changed regions (see 1302 of FIG. 13) representing the target A 301.

As described above, the directly-above image labeling unit 90 and the front image labeling unit 100 perform labeling on grids included in transformed changed regions shown in a directly-above viewpoint image and grids included in changed regions shown in a frontal viewpoint image, respectively.

The directly-above image labeling unit 90 uses the transformed changed regions assigned information on the label numbers, as labeled transformed changed regions, and outputs information on a directly-above viewpoint image showing the labeled transformed changed regions to the label dividing unit 110.

The front image labeling unit 100 uses the changed regions assigned information on the label numbers, as labeled changed regions, and outputs information on a frontal viewpoint image showing the labeled changed regions to the label dividing unit 110.

The description returns to FIG. 1.

The label dividing unit 110 sorts the label numbers assigned to the respective grids included in the labeled changed regions which are shown in the frontal viewpoint image, on a per object 201 basis, on the basis of the information on the directly-above viewpoint image showing the labeled transformed changed regions which is outputted from the directly-above image labeling unit 90 and the information on the frontal viewpoint image showing the labeled changed regions which is outputted from the front image labeling unit 100.

The operation of the label dividing unit 110 will be described in detail using drawings.

Description is made below assuming that, for example, a directly-above viewpoint image showing labeled transformed changed regions on the basis of information outputted from the directly-above image labeling unit 90 is the directly-above viewpoint image such as that shown in FIG. 13, and a frontal viewpoint image showing labeled changed regions on the basis of information outputted from the front image labeling unit 100 is the frontal viewpoint image such as that shown in FIG. 12.

The label dividing unit 110 compares the directly-above viewpoint image showing the labeled transformed changed regions with the frontal viewpoint image showing the labeled changed regions.

As shown in FIG. 13, in the directly-above viewpoint image showing the labeled transformed changed regions, of the grids in the transformed changed regions, grids included in the target A 301 (see 1302 of FIG. 13) and grids included in the target B 302 (see 1301 of FIG. 13) are separated from each other, and are assigned different label numbers "1" and "2".

On the other hand, as shown in FIG. 12, in the frontal viewpoint image showing the labeled changed regions, of the grids in labeled changed regions 1201, grids included in the target A 301 and grids included in the target B 302 are not separated from each other, and are assigned the same label number "1".

The label dividing unit 110 compares the directly-above viewpoint image showing the labeled transformed changed regions with the frontal viewpoint image showing the labeled changed regions with the X-axes matching each other, separates the grids included in the target A 301 and the grids included in the target B 302, both of which are included in the grids included in the labeled changed regions, on the basis of the label numbers assigned to the respective grids included in the labeled transformed changed regions, and reassigns label numbers for each object 201.

FIGS. 14 and 15 are diagrams for describing specific operation for reassigning label numbers to the respective grids included in the labeled changed regions by the label dividing unit 110 in the first embodiment.

Figure 14A:
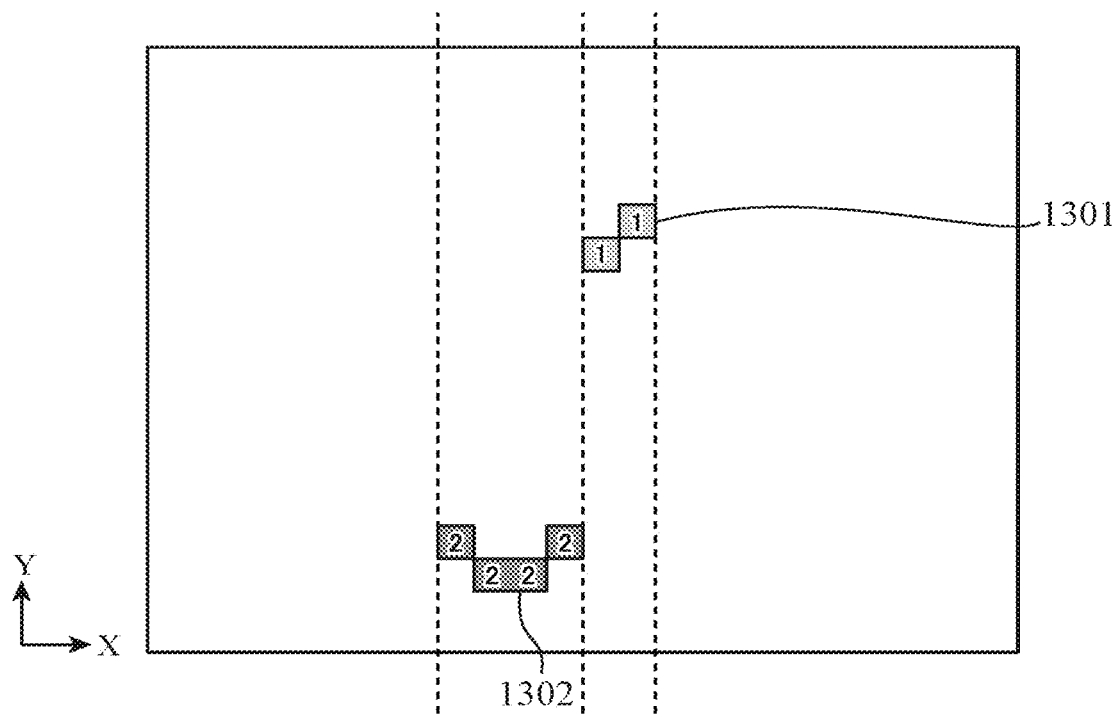
FIG. 14 is diagrams for describing specific operation for reassigning label numbers to respective grids included in labeled changed regions by a label dividing unit in the first embodiment.
Figure 15A:
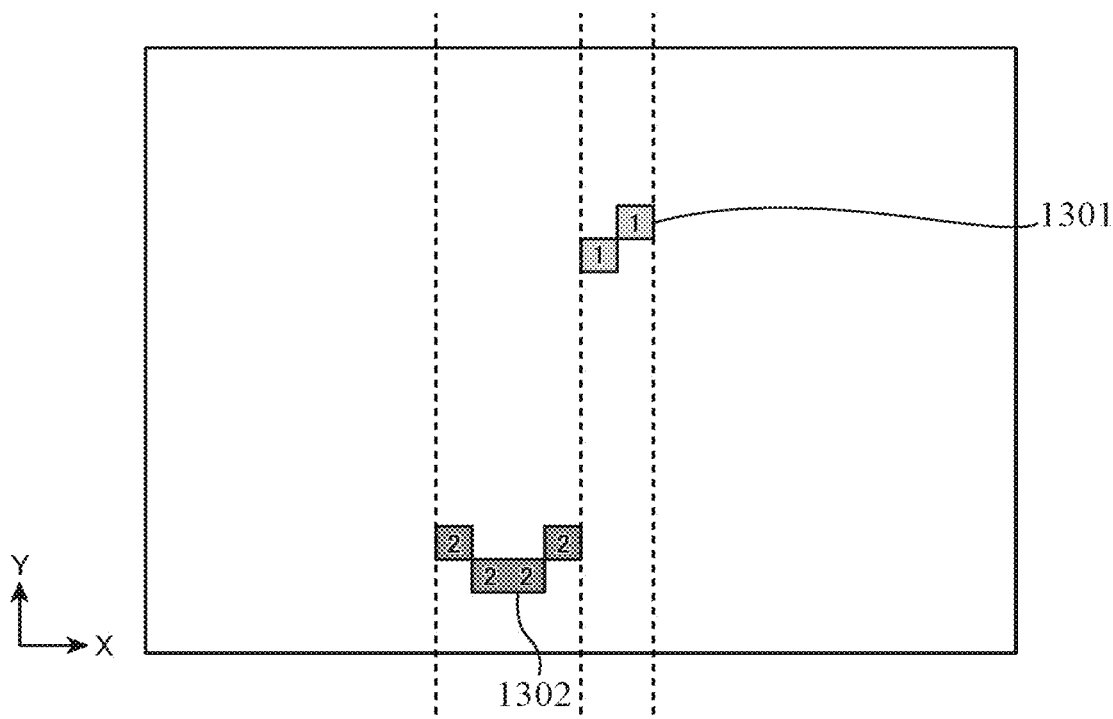
FIG. 15 is diagrams for describing specific operation for reassigning label numbers to the respective grids included in the labeled changed regions by the label dividing unit in the first embodiment.

FIGS. 14A and 15A show images of a directly-above viewpoint image showing the labeled transformed changed regions 1301 and 1302. In FIGS. 14A and 15A, each grid included in the labeled transformed changed regions 1301 and 1302 is additionally noted with a label number assigned by the directly-above image labeling unit 90.

Figure 14B:
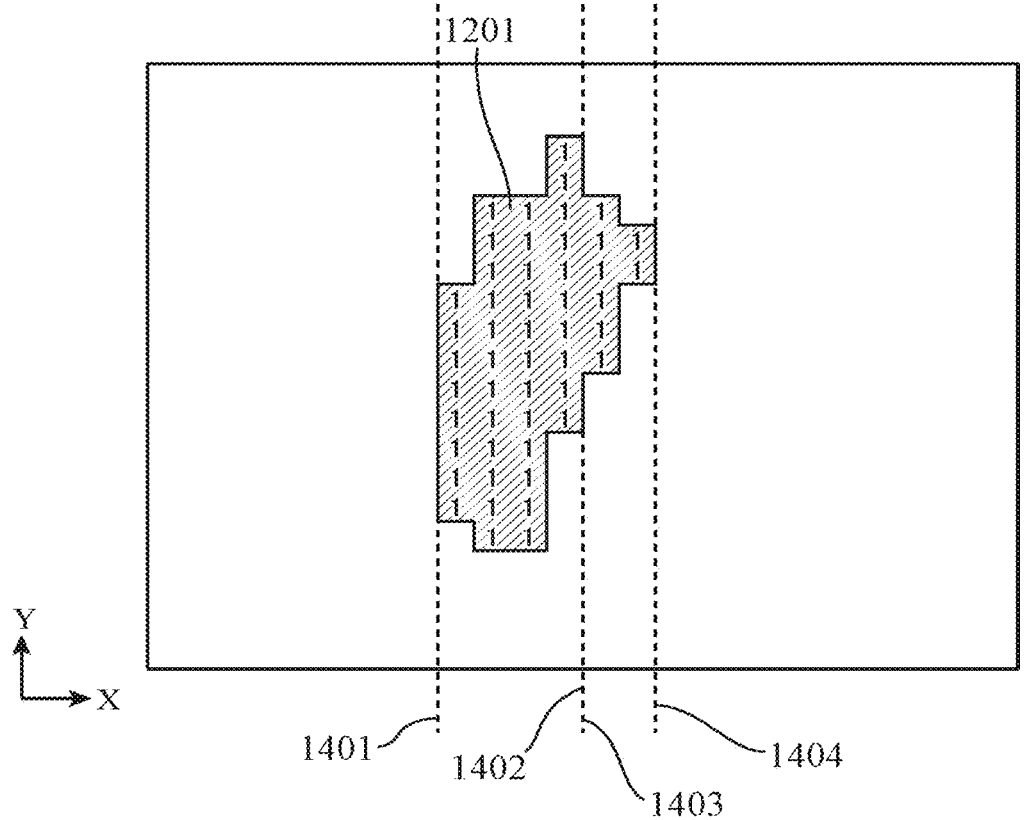
Figure 15B:
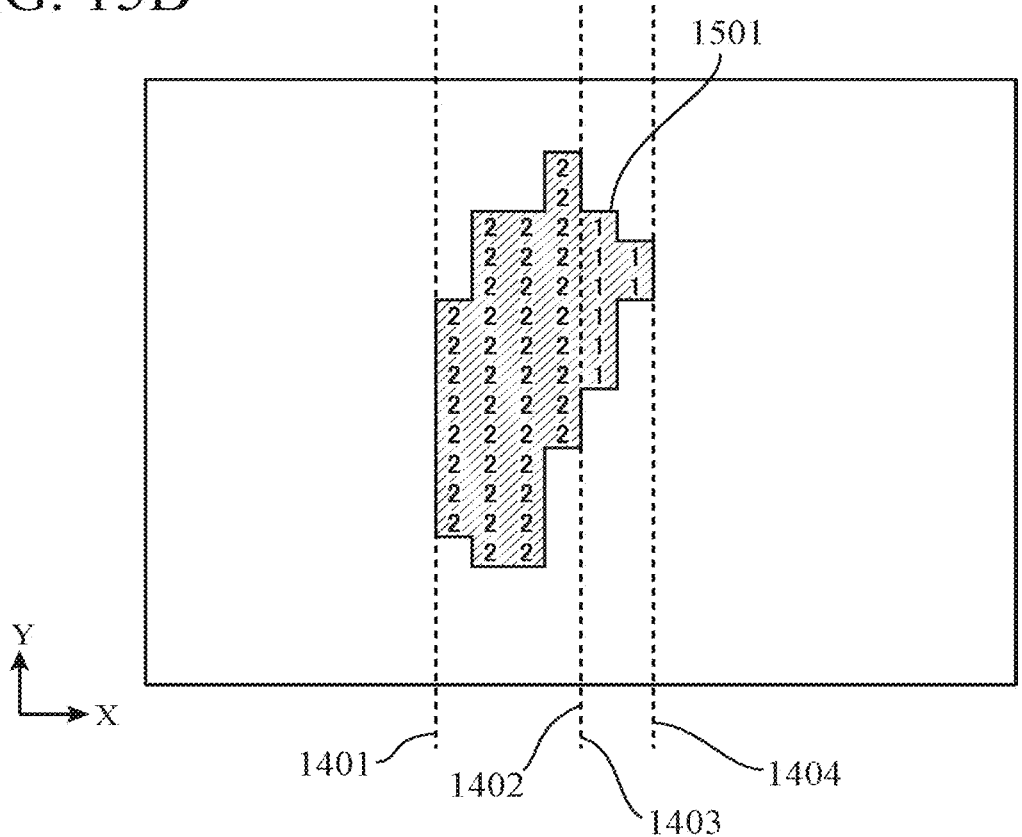

In addition, FIG. 14B is an image of a frontal viewpoint image showing labeled changed regions, and each grid included in the labeled changed regions 1201 is additionally noted with a label number assigned by the front image labeling unit 100. In addition, FIG. 15B is an image of a frontal viewpoint image showing labeled changed regions 1501 obtained after reassigning label numbers by the label dividing unit 110, and each grid included in the labeled changed regions 1501 is additionally noted with a label number reassigned by the label dividing unit 110.

First, as shown in FIG. 14, the label dividing unit 110 determines the positions of both ends in the X-axis direction of the target A 301 and the positions of both ends in the X-axis direction of the target B 302 from the directly-above viewpoint image (FIG. 14A). The positions of both ends of the target A 301 and the positions of both ends of the target B 302 can be determined from the label numbers assigned to the grids in the labeled transformed changed regions 1301 and 1302.

Note that in FIG. 14A the grids included in the target A 301 are grids assigned the label number "2" (see 1302 of FIG. 14) and the grids included in the target B 302 are grids assigned the label number "1" (see 1301 of FIG. 14).

The label dividing unit 110 sets, in the directly-above viewpoint image, straight lines that pass through each of the determined positions of both ends of the target A 301 and positions of both ends of the target B 302 and that perpendicularly intersect the X-axis.

Here, four straight lines are set that respectively pass through at a left end of the target A 301, a right end of the target A 301, a left end of the target B 302, and a right end of the target B 302 along the X-axis. In FIG. 14, the four straight lines are indicated by an A's left dotted line 1401, an A's right dotted line 1402, a B's left dotted line 1403, and a B's right dotted line 1404, respectively. Note that here the A's right dotted line 1402 and the B's left dotted line 1403 overlap each other.

Furthermore, the label dividing unit 110 sets each of the A's left dotted line 1401, the A's right dotted line 1402, the B's left dotted line 1403, and the B's right dotted line 1404 which are set in the directly-above viewpoint image, in the frontal viewpoint image (FIG. 14B), too, such that they are set in the same positions as the X-axis positions in the directly-above viewpoint image.

As shown in FIG. 12, since all grids in the labeled changed regions 1201 are assigned the same label number, the grids included in the target A 301 are not separated from the grids included in the target B 302. However, by the straight lines set in the frontal viewpoint image, even in such labeled changed regions 1201, each of the positions of the grids included in the target A 301 and the grids included in the target B 302 can be determined.

As shown in FIG. 14B, the label dividing unit 110 separates the grids in the labeled changed regions 1201 into grids included in the target A 301 and grids included in the target B 302, according to the A's left dotted line 1401, the A's right dotted line 1402, the B's left dotted line 1403, and the B's right dotted line 1404, and reassigns label numbers such that different label numbers are assigned to different objects 201.

Here, as shown in FIG. 15B, the label dividing unit 110 allows label numbers assigned to the grids included in the labeled changed regions 1501 to match the label numbers assigned to the grids in the labeled transformed changed regions 1301 and 1302. Specifically, the label dividing unit 110 reassigns label numbers such that the label number of the grids included in the target A 301 is "2" and the label number of the grids included in the target B 302 is "1".

Note that this is merely an example and the configuration may be any as long as the label dividing unit 110 reassigns label numbers to grids that are included in a plurality of different objects 201 and determined on the basis of the label numbers assigned to the grids included in the labeled transformed changed regions 1301 and 1302, on a per included object 201 basis.

The label dividing unit 110 uses the labeled changed regions assigned label numbers which are reassigned to each grid, as fixed labeled changed regions, and outputs information on a frontal viewpoint image showing the fixed labeled changed regions to the object identifying unit 120.

The object identifying unit 120 identifies objects 201 present in the field of view of the three-dimensional laser scanner 10, on the basis of the information on a frontal viewpoint image showing the fixed labeled changed regions which is outputted from the label dividing unit 110.

Specifically, for example, when information on a frontal viewpoint image showing the fixed labeled changed regions 1501 such as that shown in FIG. 15B is outputted from the label dividing unit 110, the object identifying unit 120 identifies two objects 201 present in the field of view of the three-dimensional laser scanner 10 from the fact that two types of label numbers, the label number "1" and the label number "2", are assigned, on the basis of the label numbers assigned to the grids included in the fixed labeled changed regions 1501.

Then, the object identifying unit 120 sets Feret diameters such that each Feret diameter includes grids included in the same object 201.

Figure 16:
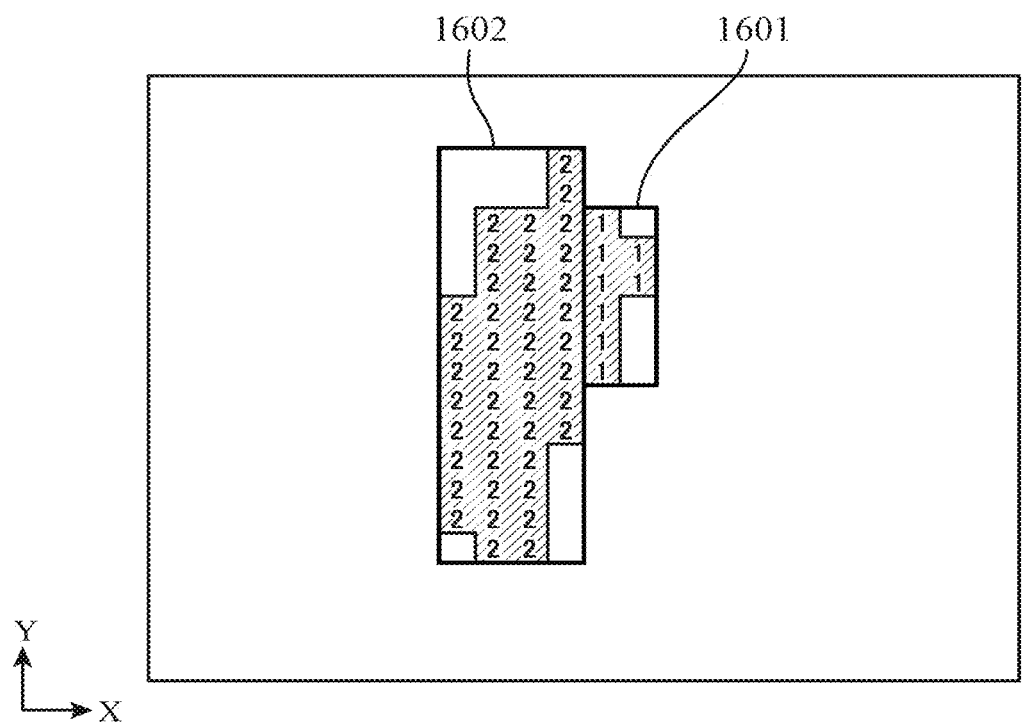
FIG. 16 is a diagram showing an example of setting Feret diameters for grids included in fixed labeled changed regions by an object identifying unit in the first embodiment.

FIG. 16 is a diagram showing an example of setting Feret diameters for grids included in fixed labeled changed regions by the object identifying unit 120 in the first embodiment.

Note that FIG. 16 shows an image of a frontal viewpoint image showing fixed labeled changed regions set with Feret diameters.

As shown in FIG. 16, the object identifying unit 120 sets circumscribed rectangles for the grids assigned the label number "1" and the grids assigned the label numbers "2", and sets a first Feret diameter 1601 and a second Feret diameter 1602. Here, the circumscribed rectangle for the grids assigned the label number "1" is the first Feret diameter 1601, and the circumscribed rectangle for the grids assigned the label number "2" is the second Feret diameter 1602. Namely, the grids included in the target A 301 having the second Feret diameter 1602 and the grids included in the target B 302 having the first Feret diameter 1601 are separated from each other.

The object identifying unit 120 uses fixed labeled changed regions assigned information on the first Feret diameter 1601 and the second Feret diameter 1602, as recognition target regions, and outputs information on a frontal viewpoint image showing the recognition target regions to the recognition processing unit 50.

As such, the monitoring device 1000 according to the first embodiment compares current data representing the field of view of the three-dimensional laser scanner 10 with comparison data in a two-dimensional image, extracts changed regions on the basis of differences between distance data, and generates information on transformed changed regions obtained by performing a coordinate transformation on the changed regions.

Then, the monitoring device 1000 performs labeling on each of grids included in the changed regions and grids included in the transformed changed regions by two-dimensional labeling, and when, for results obtained by performing two-dimensional labeling on the grids included in the changed regions, the same label number is assigned to a plurality of different objects 201, the monitoring device 1000 reassigns label numbers such that different label numbers are assigned to the different objects 201, using results obtained by performing two-dimensional labeling on the grids included in the transformed changed regions. By this, it is possible to make a determination of the objects 201 taking into account a near-far difference even by two-dimensional labeling.

Figure 17:
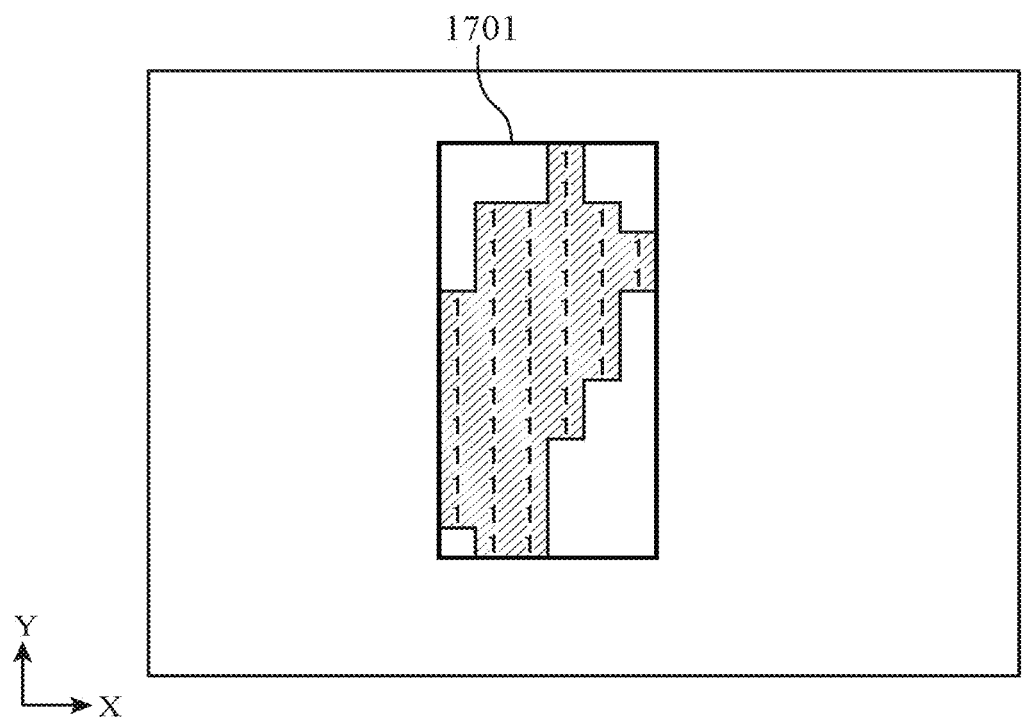
FIG. 17 is a diagram showing an example of an image of a frontal viewpoint image showing changed regions for a case in which a Feret diameter for determining an object is set on the basis of only results obtained by performing two-dimensional labeling on grids included in changed regions, without using results obtained by performing two-dimensional labeling on grids included in transformed changed regions.

Here, FIG. 17 is a diagram showing an example of an image of a frontal viewpoint image showing changed regions for a case in which a Feret diameter for determining an object 201 is set on the basis of only results obtained by performing two-dimensional labeling on grids included in changed regions, without using results obtained by performing two-dimensional labeling on grids included in transformed changed regions.

In FIG. 17, as an example, it is assumed that objects 201 are determined on the basis of the labeled changed regions 1201 which are results obtained by performing two-dimensional labeling on the grids included in the changed regions as shown in the frontal viewpoint image shown in FIG. 12.

In the frontal viewpoint image shown in FIG. 12, despite the fact that the grids in the labeled changed regions 1201 include the target A 301 and the target B 302, the grids are assigned the same label number "1".

When objects 201 are determined only from results obtained by performing two-dimensional labeling on the labeled changed regions 1201 shown in the frontal viewpoint image, it is determined that there is only one object 201, and only one Feret diameter is set, too (see 1701 of FIG. 17).

This results from the fact that a near-far difference between a position where the target A 301 is present and a position where the target B 302 is present cannot be determined only from the labeled changed regions 1201 shown in the frontal viewpoint image.

As described above, the monitoring device 1000 according to the first embodiment creates transformed changed regions shown in a directly-above viewpoint image, which allow to determine a near-far difference between a position where the target A 301 is present and a position where the target B 302 is present, and determines objects 201 included in grids in changed regions, using the transformed changed regions. By this, even by making a determination of objects 201 by two-dimensional labeling, a plurality of different objects 201 which are considered one object in the changed regions can be properly identified as different objects 201.

Note that, for example, by a three-dimensional labeling technique instead of two-dimensional labeling, a near-far difference between different objects 201 can be determined, and thus, even when there are two targets A 301 and B 302 which are present in overlapping positions as viewed from the front (see FIG. 5C), the targets A 301 and B 302 can be identified using distance data.

A method for determining a plurality of objects 201 using a conventional general three-dimensional labeling technique will be briefly described below.

Note that here, as an example, it is assumed that, as shown in FIG. 5, the floor 303, the target A 301, and the target B 302 present in the field of view of the three-dimensional laser scanner 10 are represented as a part of the 8×4×4 cubes (see FIG. 5B), and the target A 301 and the target B 302 are identified by three-dimensional labeling based on distance data for each cube.

In the three-dimensional labeling, labeling targets also include adjacent cubes in the depth direction.

For example, when a found cube in a changed region is a cube adjacent to a cube already assigned a label number, the found cube in the changed region is assigned the same label number.

Figure 18:
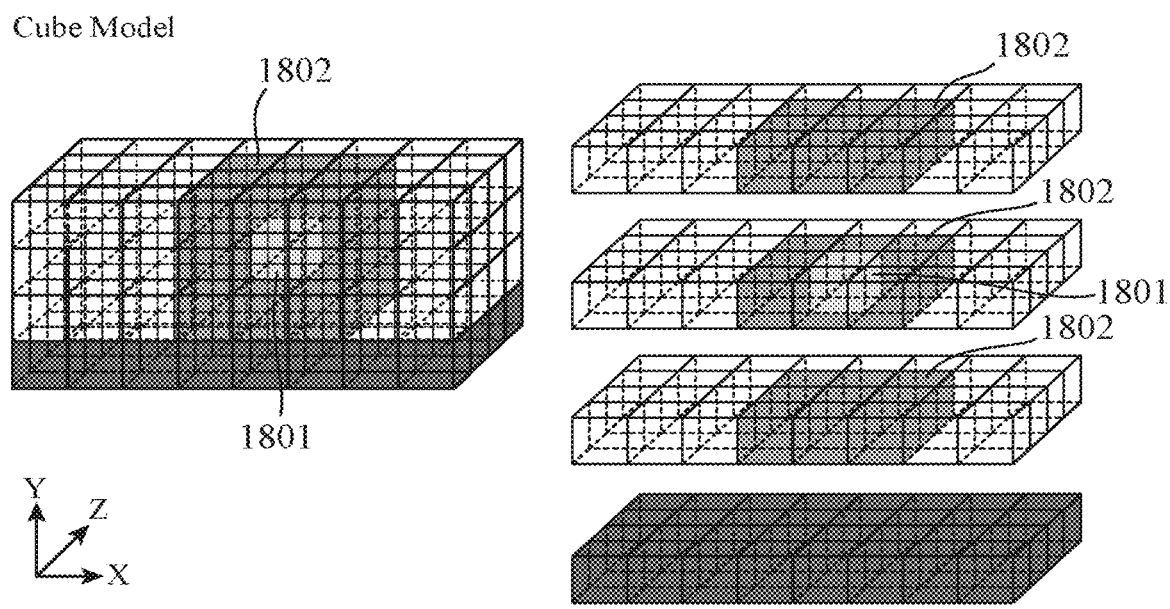
FIG. 18 is a diagram for describing an example of a search range for determining whether a found cube in a changed region is adjacent to a cube already assigned a label number.

FIG. 18 is a diagram for describing an example of a search range for determining whether a found cube in a changed region is adjacent to a cube already assigned a label number.

In FIG. 18, adjacent cubes refer to cubes whose difference in X-coordinate, whose difference in Y-coordinate, and whose difference in Z-coordinate are all within ±1, and a found cube in a changed region is represented as a focused cube 1801, and cubes adjacent to the focused cube 1801 are represented as adjacent cubes 1802.

When the adjacent cubes 1802 include a cube already assigned a label number, the focused cube 1801 is assigned the same label number as the adjacent cube 1802 already assigned the label number.

Figure 19:
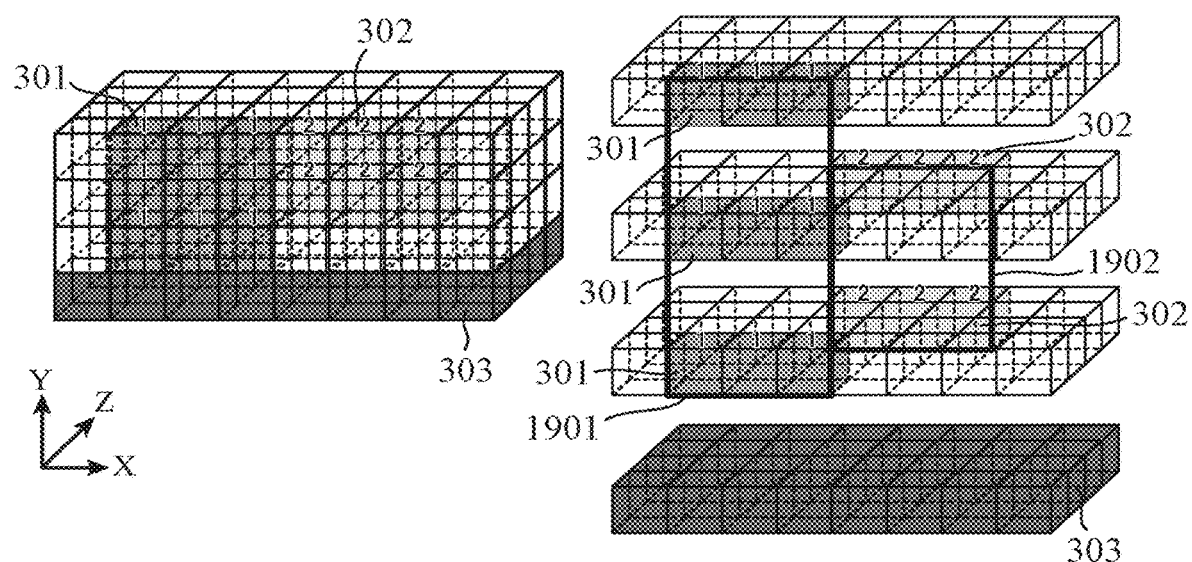
FIG. 19 is a diagram showing results obtained by performing object identification on the cube model such as that shown in FIG. 5, on the basis of the concept described using FIG. 18.

FIG. 19 shows results obtained by identifying objects 201 for a cube model such as that shown in FIG. 5, on the basis of the above-described concept described using FIG. 18.

FIG. 19 shows that the cubes included in the target A 301 are assigned the label number "1" and the cubes included in the target B 302 are assigned the label number "2". Namely, it indicates that by three-dimensional labeling, cubes in changed regions have been able to be identified as cubes included in two objects 201.

Here, a circumscribed rectangle for the cubes assigned the label number "1", i.e., the cubes included in the target A 301, is set as a first Feret diameter 1901. In addition, a circumscribed rectangle for the cubes assigned the label number "2", i.e., the cubes included in the target B 302, is set as a second Feret diameter 1902.

As described above, by identifying objects 201 by a three-dimensional labeling technique using distance data, the target A 301 and the target B 302 can be identified as different objects 201.

However, identifying objects 201 by the three-dimensional labeling technique has the following problem.

As shown in FIG. 18, the total number of adjacent cubes 1802 which are adjacent to the focused cube 1801 is 26. Namely, in the three-dimensional labeling technique, when, for example, adjacent cubes are within ±1 for all X-, Y-, and Z-coordinates, comparison computation needs to be performed 26 times for a single focused cube 1801 to complete a three-dimensional labeling task for the single focused cube 1801.

On the other hand, in a two-dimensional labeling technique, even when, as in the case of the above-described three-dimensional labeling, for example, grids present in a range of ±1 from a target to be labeled (here, a focused grid) serve as adjacent grids such that grids within ±1 for both X- and Y-coordinates serve as adjacent grids, the number of adjacent grids is eight. Namely, by performing comparison computation eight times for a single focused grid, a two-dimensional labeling task for the focused grid is completed.

As such, there is an over three-times difference in the amount of computation between three-dimensional labeling and two-dimensional labeling. Note that although in the above-described example, cubes or grids present in a range of ±1 from a focused cube or a focused grid are subjected to comparison computation, if the range of cubes or grids subjected to the comparison computation is further extended, then the difference in the amount of computation also further increases.

For example, when cubes or grids present in a range of ±2 from a focused cube or a focused grid are subjected to comparison computation, in three-dimensional labeling, the number of adjacent cubes is 124 and comparison computation needs to be performed 124 times for a single focused cube.

On the other hand, in two-dimensional labeling, the number of adjacent grids is 24 and comparison computation needs to be performed only 24 times for a single focused grid.

In this case, there is an over five-times difference in the amount of computation between three-dimensional labeling and two-dimensional labeling.

As described above, when objects 201 are identified using the three-dimensional labeling technique, whether there is contact in Z-coordinates can also be simultaneously identified and it seems to be effective, but in practice, identifying objects 201 requires such an amount of computation that is three times or five times that of two-dimensional labeling, and thus, there is a problem that computation cost also increases compared to two-dimensional labeling.

The monitoring device 1000 according to the first embodiment can, as described above, identify objects 201 by a two-dimensional labeling technique while taking also into account whether there is contact in Z-coordinates, on the basis of distance data by creating transformed changed regions. That is, the monitoring device 1000 according to the first embodiment enables to identify objects with a suppressed amount of computation, using differences in distance and without performing three-dimensional labeling.

The description returns to FIG. 1.

The recognition processing unit 50 extracts features such as an "area", "vertical and horizontal dimensions", and a "speed" from the changed regions for each Feret diameter, on the basis of the information on the frontal viewpoint image showing the recognition target regions which is outputted from the object identifying unit 120, and performs a recognition process for determining whether changed regions are a notification target, on the basis of whether the extracted features satisfy predetermined conditions. When the recognition processing unit 50 recognizes that the changed regions are a notification target, the recognition processing unit 50 outputs notification instruction information to the notification processing unit 60.

The notification processing unit 60 performs a notification process on the basis of the notification instruction information outputted from the recognition processing unit 50. The notification process includes a process of transmitting a specific signal to a device such as the PC 300 which is a higher-level device, a process of allowing a device to, for example, sound a buzzer, or the like.

Note that although in the first embodiment, as shown in FIG. 1, the three-dimensional laser scanner 10 is included in the monitoring device 1000, the configuration is not limited thereto, and the three-dimensional laser scanner 10 may be provided external to the monitoring device 1000, and the monitoring device 1000 may obtain point group data 17 from the three-dimensional laser scanner 10 through a network, etc.

Next, the operation of the monitoring device 1000 according to the first embodiment will be described.

Figure 20:
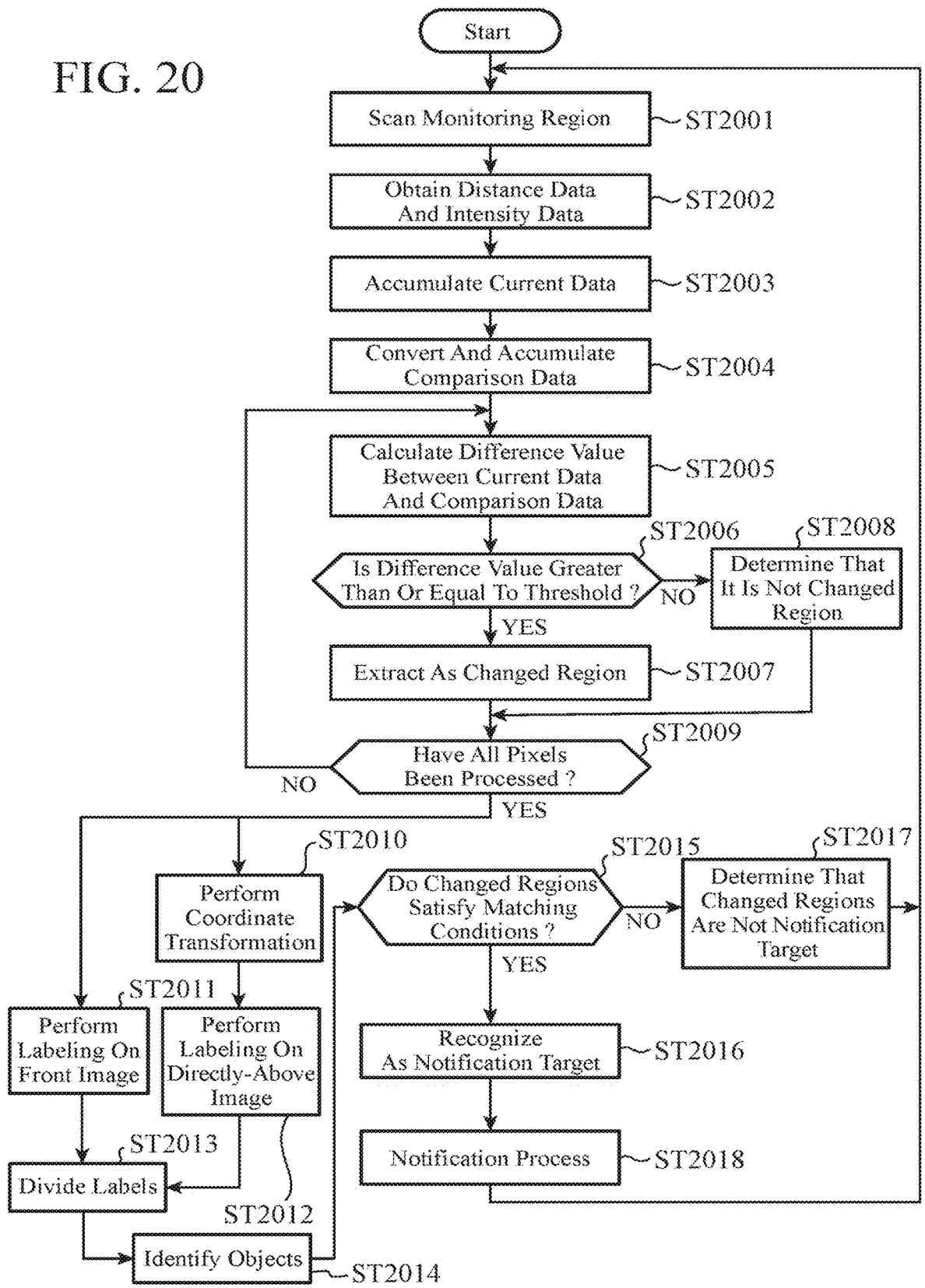
FIG. 20 is a flowchart showing the operation of the monitoring device according to the first embodiment.

FIG. 20 is a flowchart showing the operation of the monitoring device 1000 according to the first embodiment.

Note that here, for simplification of description, a case in which the resolution of the three-dimensional laser scanner 10 is 24×19 pixels will be described as an example.

First, the three-dimensional laser scanner 10 scans a background 200, i.e., the range of a monitoring region (step ST2001), and obtains point group data 17, i.e., distance data and intensity data (step ST2002). Specifically, the range of the background 200 is divided into 24×19 which is the resolution of the three-dimensional laser scanner 10, and scanned. The distance data is generally digital data, and here, the distance data is 8-bit multi-level data per pixel of the 24×19 pixels.

The three-dimensional laser scanner 10 outputs the obtained point group data to the current data computing unit 20 and the comparison data computing unit 30.

The current data computing unit 20 accumulates, as current data, the distance data included in the point group data 17 for the 24×19 pixels which is obtained at step ST2002 in the current data accumulating unit 21 (step ST2003). The image of the current data is as shown in FIG. 6. Note that in FIG. 6B each grid is additionally noted with the distance data.

The comparison data computing unit 30 converts distance data included in point group data 17 for the 24×19 pixels that is obtained at step ST2002 in the past and accumulated in a data accumulating unit which is not shown, into comparison data, and accumulates the comparison data in the comparison data accumulating unit 31 (step ST2004). The image of the comparison data is as shown in FIG. 7. Note that in FIG. 7B each grid is additionally noted with the distance data.

The changed-region extracting unit 40 obtains the current data accumulated in the current data accumulating unit 21 and the comparison data accumulated in the comparison data accumulating unit 31, calculates a difference value by making a grid-by-grid comparison between the current data and the comparison data (see FIG. 8), and extracts a pixel region whose calculated difference value is greater than or equal to a preset threshold, as a changed region (step ST2005 and see FIG. 9). In the process at step ST2005, since the current data and the comparison data are composed of distance data, the difference value calculated by the changed-region extracting unit 40 indicates the "difference in distance". For example, when the current data includes the background 200 and an object 201 and the comparison data includes only the background 200, a difference value to be obtained indicates the "distance between the background of the comparison data and the object of the current data".

The difference value obtained at step ST2005 is 8-bit multi-level data per pixel, and the changed-region extracting unit 40 determines whether the obtained difference value is greater than or equal to a preset threshold (step ST2006). If the difference value is greater than or equal to the threshold (if "YES" at step ST2006), a corresponding pixel region is extracted as a changed region (step ST2007). The changed-region extracting unit 40 outputs information on the extracted changed region to the front image creating unit 70. Then, on the basis of the information on the changed region outputted from the changed-region extracting unit 40, the front image creating unit 70 creates a frontal viewpoint image in which the changed region is represented by a pixel region in an image showing the monitoring region, and outputs information on the frontal viewpoint image to the coordinate transforming unit 80 and the front image labeling unit 100.

On the other hand, if the difference value is less than the threshold (if "NO" at step ST2006), it is determined that the corresponding pixel region is not a changed region (step ST2008) and processing proceeds to a process at step ST2009. Thereafter, the changed-region extracting unit 40 determines whether the processes have been performed for all 24×19 pixels (step ST2009). If the processes have not been performed for all 24×19 pixels (if "NO" at step ST2009), processing returns to the process at step ST2005 and the above-described processes are repeated.

On the other hand, if the processes have been performed for all 24×19 pixels (if "YES" at step ST2009), the coordinate transforming unit 80 creates, on the basis of the information on the frontal viewpoint image outputted from the front image creating unit 70 at step ST2007, an image in which the viewpoint of the frontal viewpoint image is moved (step ST2010). Specific operation is as described using FIGS. 9, 10, etc. The coordinate transforming unit 80 outputs information on a directly-above viewpoint image of transformed changed regions to the directly-above image labeling unit 90.

On the basis of the information of the frontal viewpoint image showing the changed regions which is outputted from the front image creating unit 70 at step ST2007, the front image labeling unit 100 performs labeling on each grid included in the changed regions (step ST2011). Specific operation is as described using FIGS. 11, 12, etc. The front image labeling unit 100 outputs information on a frontal viewpoint image showing the labeled changed regions to the label dividing unit 110.

On the basis of the information on a directly-above viewpoint image showing transformed changed regions which is outputted from the coordinate transforming unit 80 at step ST2010, the directly-above image labeling unit 90 performs labeling on each grid included in the transformed changed regions (step ST2012). Specific operation is as described using FIGS. 11, 13, etc. The directly-above image labeling unit 90 outputs information on a directly-above viewpoint image showing the labeled transformed changed regions to the label dividing unit 110.

On the basis of the information on a directly-above viewpoint image showing the labeled transformed changed regions which is outputted from the directly-above image labeling unit 90 at step ST2012 and the information on a frontal viewpoint image showing the labeled changed regions which is outputted from the front image labeling unit 100 at step ST2011, the label dividing unit 110 sorts the label numbers assigned to the respective grids included in the labeled changed regions which are shown in the frontal viewpoint image, on a per object 201 basis (step ST2013). Specific operation is as described using FIGS. 14, 15, etc. The label dividing unit 110 outputs information on a frontal viewpoint image showing fixed labeled changed regions which are assigned the reassigned label numbers to the object identifying unit 120.

The object identifying unit 120 identifies objects 201 present in the field of view of the three-dimensional laser scanner 10, on the basis of the information on a frontal viewpoint image showing fixed labeled changed regions which is outputted from the label dividing unit 110 at step ST2013 (step ST2014) Specific operation is as described using FIGS. 15, 16, etc. The object identifying unit 120 outputs information on a frontal viewpoint image showing recognition target regions which are assigned information on Feret diameters to the recognition processing unit 50.

The recognition processing unit 50 extracts features such as an "area", "vertical and horizontal dimensions", and a "speed" from changed regions for each Feret diameter, on the basis of the information on a frontal viewpoint image showing recognition target regions which is outputted from the object identifying unit 120 at step ST201.4, and determines whether the extracted features satisfy predetermined matching conditions (step ST2015). If the features satisfy matching conditions (if "YES" at step ST2015), the recognition processing unit 50 recognizes that the changed regions are a notification target (step ST2016). When the recognition processing unit 50 recognizes that the changed regions are a notification target, the recognition processing unit 50 outputs notification instruction information to the notification processing unit 60.

On the other hand, if the features do not satisfy matching conditions (if "NO" at step ST2015), it is determined that the changed regions are not a notification target (step ST2017) and processing returns to the process at step ST2001.

Now, a determination process performed by the recognition processing unit 50 at step ST2015 will be described in detail.

Figure 21:
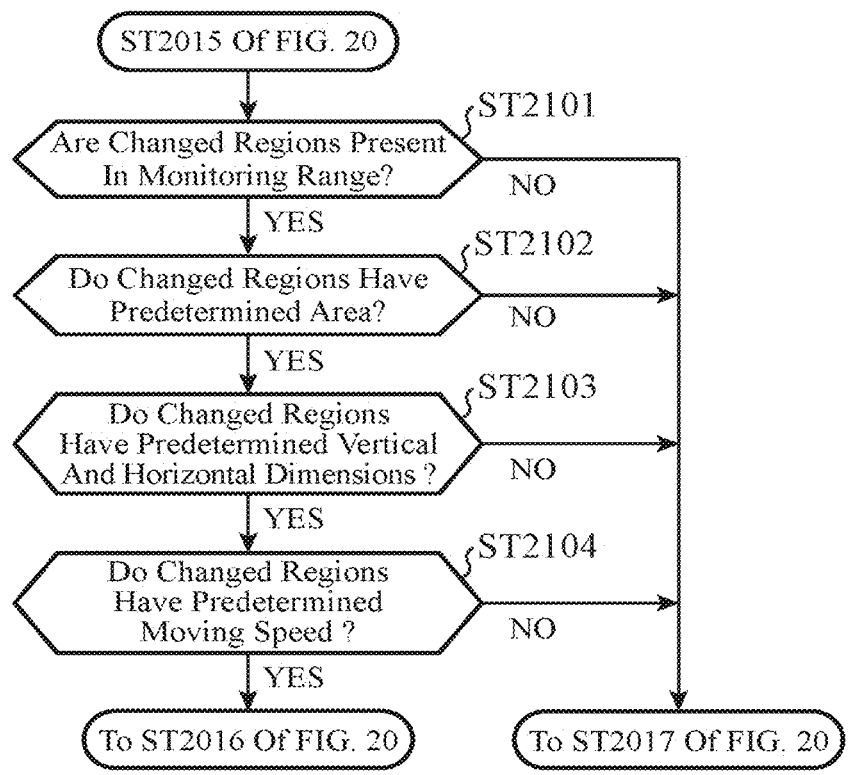
FIG. 21 is a flowchart showing a determination process performed by a recognition processing unit of the monitoring device according to the first embodiment.

FIG. 21 is a flowchart showing a determination process performed by a recognition processing unit 50 of the monitoring device 1000 according to the first embodiment.

The recognition processing unit 50 determines whether changed regions belonging to a Feret diameter are present in a monitoring range (step ST2101). Note that here the monitoring range refers to the monitoring region, i.e., a range in a measuring range of the three-dimensional laser scanner 10, e.g., a range in which when an object 201 is detected, notification is required in terms of the necessity of monitoring, and it is assumed that the monitoring range is preset.

If changed regions belonging to a Feret diameter are present in a monitoring range (if "YES" at step ST2101), the recognition processing unit 50 further determines whether the changed regions belonging to the Feret diameter have a predetermined area (step ST2102).

If the changed regions belonging to the Feret diameter have a predetermined area (if "YES" at step ST2102), the recognition processing unit 50 further determines whether the changed regions belonging to the Feret diameter have predetermined vertical and horizontal dimensions (step ST2103). If the changed regions belonging to the Feret diameter have predetermined vertical and horizontal dimensions (if "YES" at step ST2103), the recognition processing unit 50 further determines whether the changed regions belonging to the Feret diameter have a predetermined moving speed (step ST2104). If the changed regions belonging to the Feret diameter have a predetermined moving speed (if "YES" at step ST2104), processing proceeds to step ST2016 of FIG. 20, and the changed regions are recognized as a notification target.

On the other hand, if changed regions belonging to a Feret diameter are not present in a monitoring range (if "NO" at step ST2101), or if the changed regions belonging to the Feret diameter do not have a predetermined area (if "NO" at step ST2102), or if the changed regions belonging to the Feret diameter do not have predetermined vertical and horizontal dimensions (if "NO" at step ST2103), or if the changed regions belonging to the Feret diameter do not have a predetermined moving speed (if "NO" at step ST2104), processing proceeds to step ST2017 of FIG. 20, and it is determined that the changed regions are not a notification target.

Note that the recognition processing unit 50 performs the above-described operation on all Feret diameters on a per Feret diameter basis. Then, when there is even one Feret diameter that is determined to be a notification target by the recognition processing unit 50, processing proceeds to step ST2016 of FIG. 20, and changed regions belonging to the Feret diameter are recognized as a notification target.

The description returns to the flowchart of FIG. 20.

On the basis of the notification instruction information outputted from the recognition processing unit 50 at step ST2016, the notification processing unit 60 performs a notification process for the recognized notification target (step ST2018), and returns to the process at step ST2001.

Figure 22A:
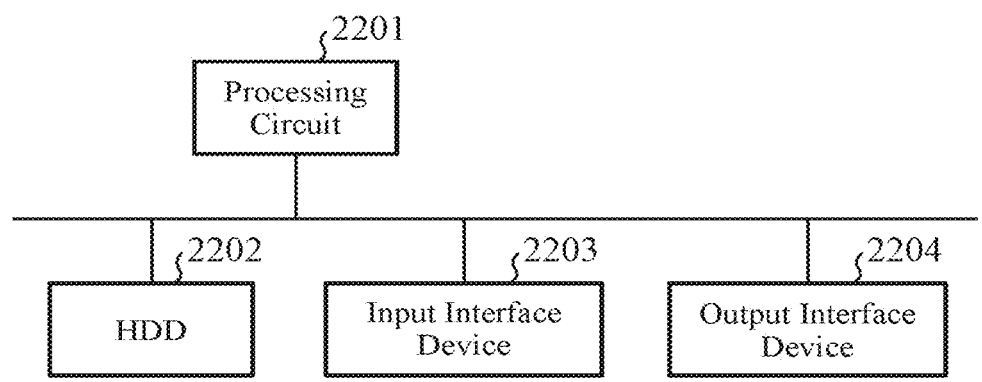
FIGS. 22A and 22B are diagrams showing examples of a hardware configuration of the monitoring device according to the first embodiment of the invention.
Figure 22B:
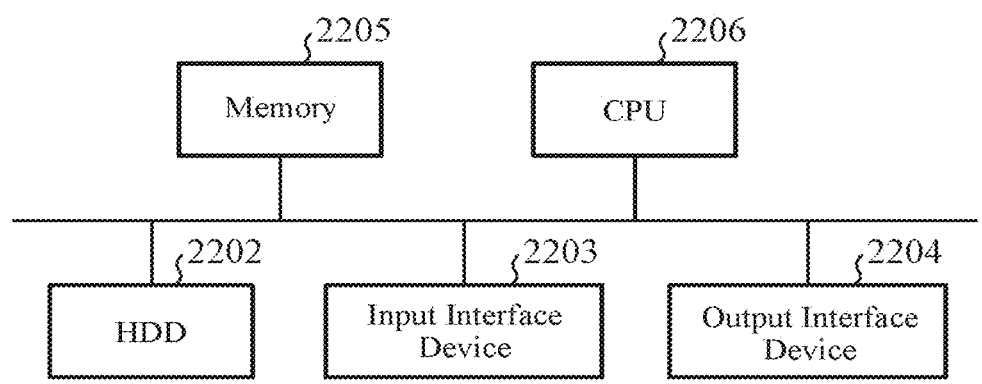

FIGS. 22A and 22B are diagrams showing examples of a hardware configuration of the monitoring device 1000 according to the first embodiment of the invention.

In the first embodiment of the invention, each function of the current data computing unit 20, the comparison data computing unit 30, the changed-region extracting unit 40, the recognition processing unit 50, the notification processing unit 60, the front image creating unit 70, the coordinate transforming unit 80, the directly-above image labeling unit 90, the front image labeling unit 100, the label dividing unit 110, and the object identifying unit 120 is implemented by a processing circuit 2201. Namely, the monitoring device 1000 includes the processing circuit 2201 for performing a notification process when a change serving as a notification target has been detected, on the basis of point group data obtained from the three-dimensional laser scanner 10.

The processing circuit 2201 may be dedicated hardware as shown in FIG. 22A, or may be a central processing unit (CPU) 2206 that executes programs stored in a memory 2205 as shown in FIG. 22B.

When the processing circuit 2201 is dedicated hardware, the processing circuit 2201 corresponds, for example, to a single circuit, a combined circuit, a programmed processor, a parallel programmed processor, an application specific integrated circuit (ASIC), or a field-programmable gate array (FPGA), or a combination thereof.

When the processing circuit 2201 is the CPU 2206, each function of the current data computing unit 20, the comparison data computing unit 30, the changed-region extracting unit 40, the recognition processing unit 50, the notification processing unit 60, the front image creating unit 70, the coordinate transforming unit 80, the directly-above image labeling unit 90, the front image labeling unit 100, the label dividing unit 110, and the object identifying unit 120 is implemented by software, firmware, or a combination of software and firmware. Namely, the current data computing unit 20, the comparison data computing unit 30, the changed-region extracting unit 40, the recognition processing unit 50, the notification processing unit 60, the front image creating unit 70, the coordinate transforming unit 80, the directly-above image labeling unit 90, the front image labeling unit 100, the label dividing unit 110, and the object identifying unit 120 are implemented by a processing circuit such as the CPU 2206 or a system large-scale integration (LSI) that executes programs stored in a hard disk drive (HDD) 2202, the memory 2205, etc. In addition, it can also be said that the programs stored in the HDD 2202, the memory 2205, etc., cause a computer to perform procedures or methods for the current data computing unit 20, the comparison data computing unit 30, the changed-region extracting unit 40, the recognition processing unit 50, the notification processing unit 60, the front image creating unit 70, the coordinate transforming unit 80, the directly-above image labeling unit 90, the front image labeling unit 100, the label dividing unit 110, and the object identifying unit 120. Here, the memory 2205 corresponds, for example, to a nonvolatile or volatile semiconductor memory such as a random access memory (RAM), a read only memory (ROM), a flash memory, an erasable programmable read only memory (EPROM), or an electrically erasable programmable read-only memory (EEPROM); a magnetic disk, a flexible disk, an optical disc, a compact disc, a MiniDisc, or a digital versatile disc (DVD).

Note that some of the functions of the current data computing unit 20, the comparison data computing unit 30, the changed-region extracting unit 40, the recognition processing unit 50, the notification processing unit 60, the front image creating unit 70, the coordinate transforming unit 80, the directly-above image labeling unit 90, the front image labeling unit 100, the label dividing unit 110, and the object identifying unit 120 may be implemented by dedicated hardware, and some may be implemented by software or firmware. For example, it is possible to implement the functions of the current data computing unit 20 and the comparison data computing unit 30 by the processing circuit 2201 which is dedicated hardware, and implement the functions of the changed-region extracting unit 40, the recognition processing unit 50, the notification processing unit 60, the front image creating unit 70, the coordinate transforming unit 80, the directly-above image labeling unit 90, the front image labeling unit 100, the label dividing unit 110, and the object identifying unit 120 by a processing circuit reading and executing programs stored in the memory 2205.

The current data accumulating unit 21 and the comparison data accumulating unit 31 use, for example, the HDD 2202. Note that this is merely an example, and the current data accumulating unit 21 and the comparison data accumulating unit 31 may be composed of a DVD, the memory 2205, etc.

In addition, the monitoring device 1000 includes an input interface device 2203 and an output interface device 2204 that perform communication with the three-dimensional laser scanner 10 or a device such as the PC 300 which is a higher-level device.

As described above, according to the first embodiment, the configuration includes the current data computing unit 20 that obtains pieces of distance data representing distances to a plurality of physical objects present in a monitoring region, from measurement results obtained by the three-dimensional laser scanner 10, and uses the distance data as current distance data, the three-dimensional laser scanner 10 measuring the monitoring region; the comparison data computing unit 30 that obtains past distance data from the measurement results, and converts the past distance data into comparison distance data; the changed-region extracting unit 40 that calculates difference values between the current distance data and the comparison distance data, and extracts changed regions whose difference values are greater than or equal to a threshold; the coordinate transforming unit 80 that creates an image obtained by transforming a frontal viewpoint image such that a viewpoint of the three-dimensional laser scanner 10 is moved, the frontal viewpoint image being based on the current distance data and the changed regions extracted by the changed-region extracting unit 40; and the object identifying unit 120 that identifies the plurality of physical objects present in the monitoring region, on the basis of the frontal viewpoint image and the image created by the coordinate transforming unit 80, and thus, objects can be identified without performing three-dimensional labeling.

Second Embodiment

In the first embodiment, the label dividing unit 110 reassigns, using information on a directly-above viewpoint image showing labeled transformed changed regions, label numbers assigned to respective grids included in labeled changed regions such that the same label number is assigned to the same object 201.

This second embodiment describes that a label dividing unit 110a does not perform a labeling process beforehand on respective grids included in changed regions, but assigns label numbers to respective grids included in changed regions not assigned label numbers, using information on a directly-above viewpoint image showing labeled transformed changed regions.

Figure 23:
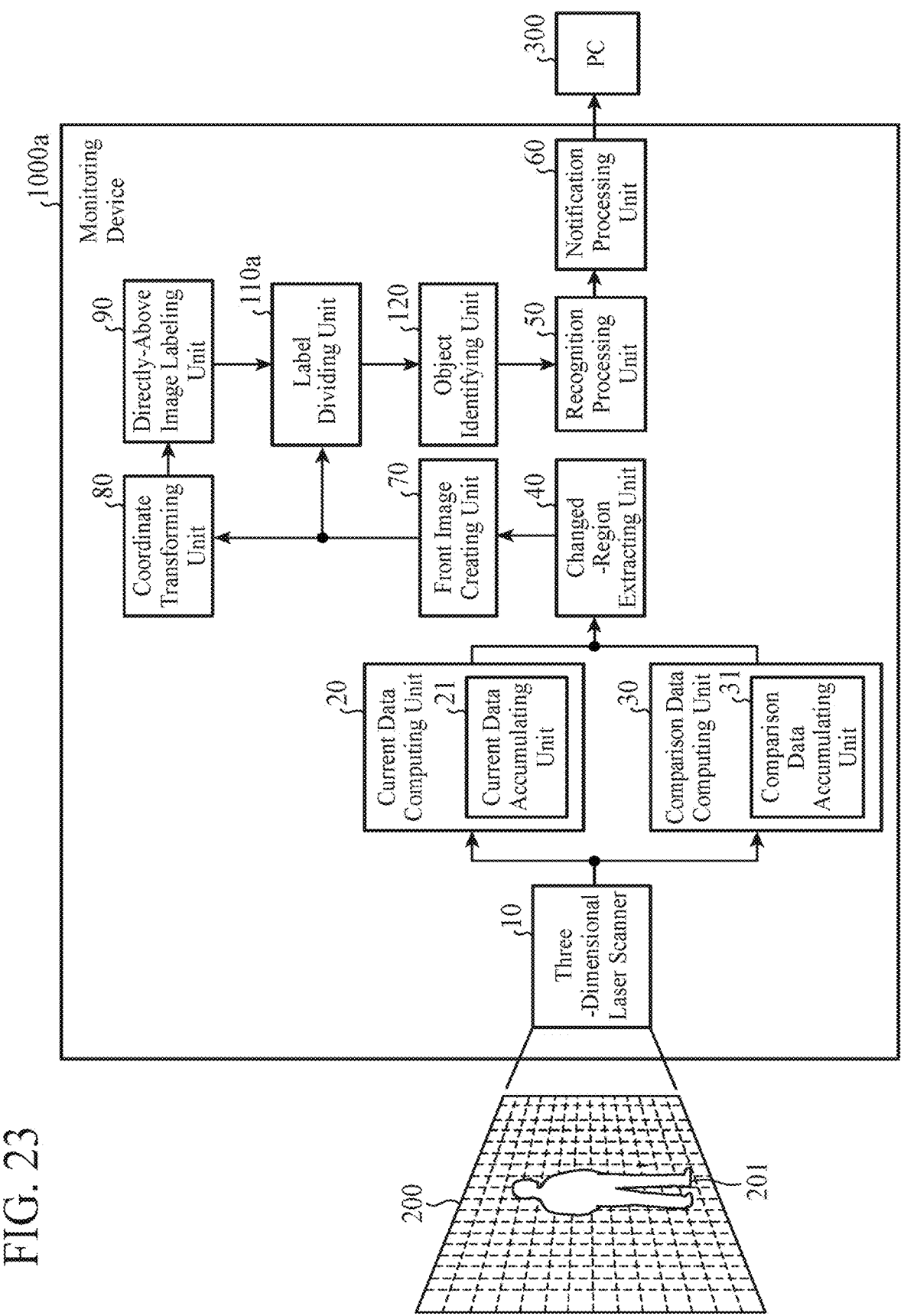
FIG. 23 is a block diagram showing a configuration of a monitoring device according to a second embodiment of the invention.

FIG. 23 is a block diagram showing a configuration of a monitoring device 1000a according to the second embodiment of the invention.

In FIG. 23, the same configurations as those of the monitoring device 1000 described using FIG. 1 in the first embodiment are denoted by the same reference signs, and an overlapping description is omitted.

The monitoring device 1000a according to the second embodiment differs from the monitoring device 1000 according to the first embodiment in that the monitoring device 1000a does not include the front image labeling unit 100. In addition, the operation of the label dividing unit 110a of the monitoring device 1000a according to the second embodiment differs from the operation of the label dividing unit 110 of the monitoring device 1000 according to the first embodiment.

Note that in the second embodiment, when the front image creating unit 70 creates a frontal viewpoint image on the basis of information on changed regions extracted by the changed-region extracting unit 40, the front image creating unit 70 outputs information on the frontal viewpoint image to the coordinate transforming unit 80 and the label dividing unit 110a.

In addition, in the second embodiment, too, it is also possible that the front image creating unit 70 is not included, and a combination of current data and information on changed regions extracted by the changed-region extracting unit 40 is regarded to be a frontal viewpoint image. In this case, for example, the changed-region extracting unit 40 outputs current data and information on changed regions to the coordinate transforming unit 80 and the label dividing unit 110a, and the coordinate transforming unit 80 and the label dividing unit 110a use a combination of the current data and information on changed regions outputted from the changed-region extracting unit 40, as a frontal viewpoint image, and operate on the basis of the frontal viewpoint image.

The hardware configuration of the monitoring device 1000a according to the second embodiment is the same as that described using FIGS. 22A and 22B in the first embodiment, and thus, an overlapping description is omitted.

Figure 24:
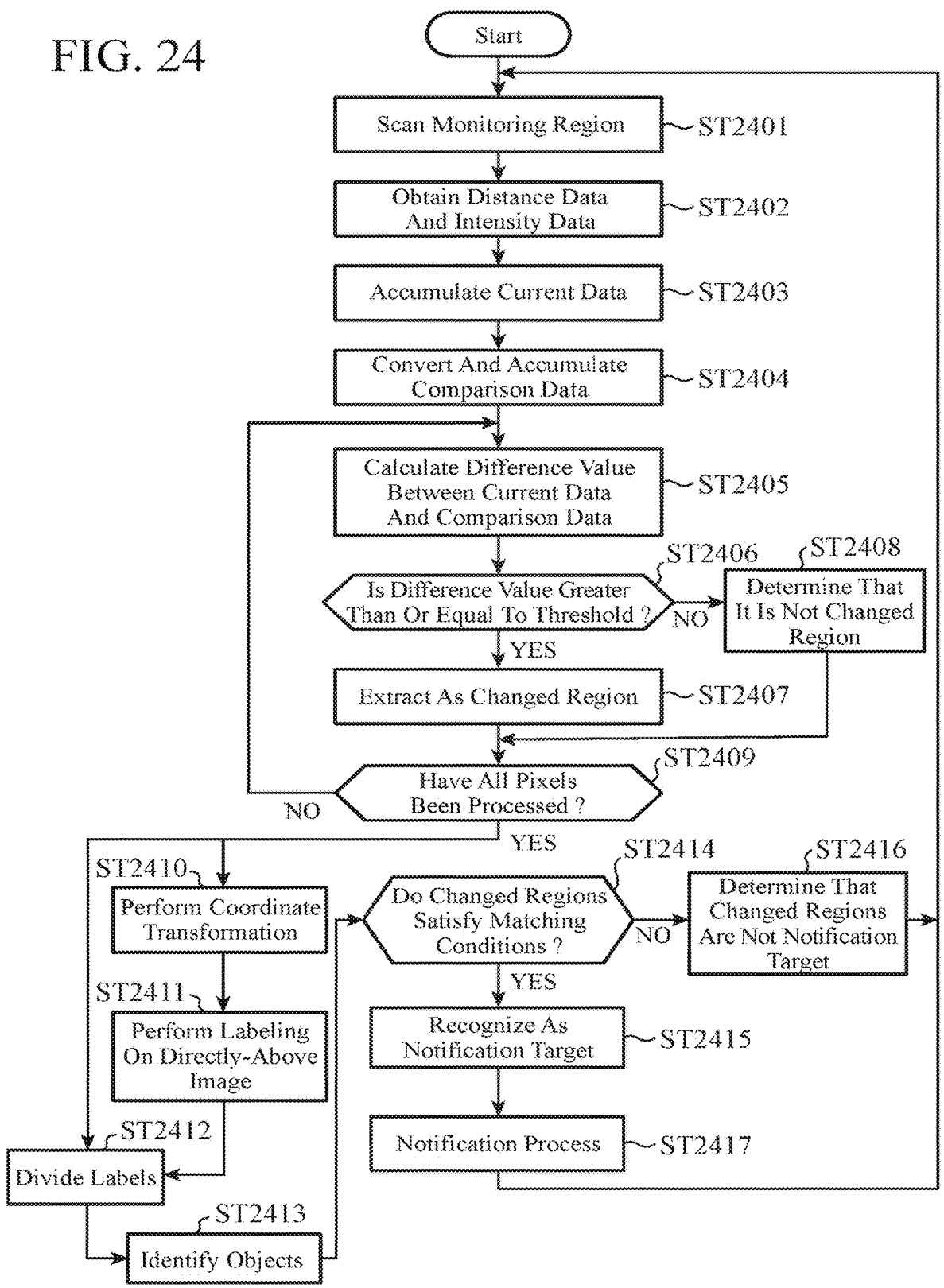
FIG. 24 is a flowchart showing the operation of the monitoring device according to the second embodiment.

FIG. 24 is a flowchart showing the operation of the monitoring device 1000a according to the second embodiment.

Operations performed at step ST2401 to 2411 and step ST2413 to 2417 of FIG. 24 are the same as operations performed at step ST2001 to 2010, 2012, and step ST2014 to 2418, respectively, which are described using FIG. 20 in the first embodiment, and thus, an overlapping description is omitted.

The only difference in the operation of the monitoring device 1000a according to the second embodiment is that the operation performed at step ST2013 of FIG. 20 described in the first embodiment is replaced by operation performed at step ST2412. Therefore, only the operation of the label dividing unit 110a at step ST2412 which differs from the first embodiment will be described below.

The label dividing unit 110a assigns label numbers for each object 201 to respective grids included in changed regions, on the basis of information on a directly-above viewpoint image showing labeled transformed changed regions which is outputted from the directly-above image labeling unit 90 at step ST2411 and information on a frontal viewpoint image which is outputted from the front image creating unit 70 at step ST2407 (step ST2412).

The operation of the label dividing unit 110a performed at step ST2412 will be described in detail using drawings.

Description is made below assuming, for example, that an image of a directly-above viewpoint image based on information outputted from the directly-above image labeling unit 90 at step ST2411 is an image of the directly-above viewpoint image such as that shown in FIG. 13, and an image of a frontal viewpoint image based on information outputted from the front image creating unit 70 at step ST2407 is an image of the frontal viewpoint image such as that shown in FIG. 9.

The label dividing unit 110a compares the directly-above viewpoint image showing labeled transformed changed regions with the frontal viewpoint image showing changed regions.

As shown in FIG. 13, in the directly-above viewpoint image showing labeled transformed changed regions, of the grids in the transformed changed regions, the grids included in the target A 301 (see 1302 of FIG. 13) and the grids included in the target B 302 (see 1301 of FIG. 13) are separated from each other, and are assigned different label numbers "1" and "2".

On the otherand, as shown in FIG. 9, in the frontal viewpoint image showing changed regions, the grids included in the target A 301 and the grids included in the target B 302 which are extracted as the changed regions 901 are not separated from each other. In addition, in the frontal viewpoint image such as that shown in FIG. 9, labeling is not performed and thus each grid is not assigned a label number.

The label dividing unit 110a compares the directly-above viewpoint image showing labeled transformed changed regions with the frontal viewpoint image showing changed regions that have not been subjected to labeling, with the X-axes matching each other, separates the grids included in the target A 301 and the grids included in the target B 302, both of which are included in the grids included in the changed regions 901, on the basis of the label numbers assigned to the respective grids included in the labeled transformed changed regions, and assigns label numbers for each object 201.

FIGS. 25 and 26 are diagrams for describing specific operation for assigning, by the label dividing unit 110a, label numbers to respective grids included in changed regions having not been subjected to labeling in the second embodiment.

Figure 25A:
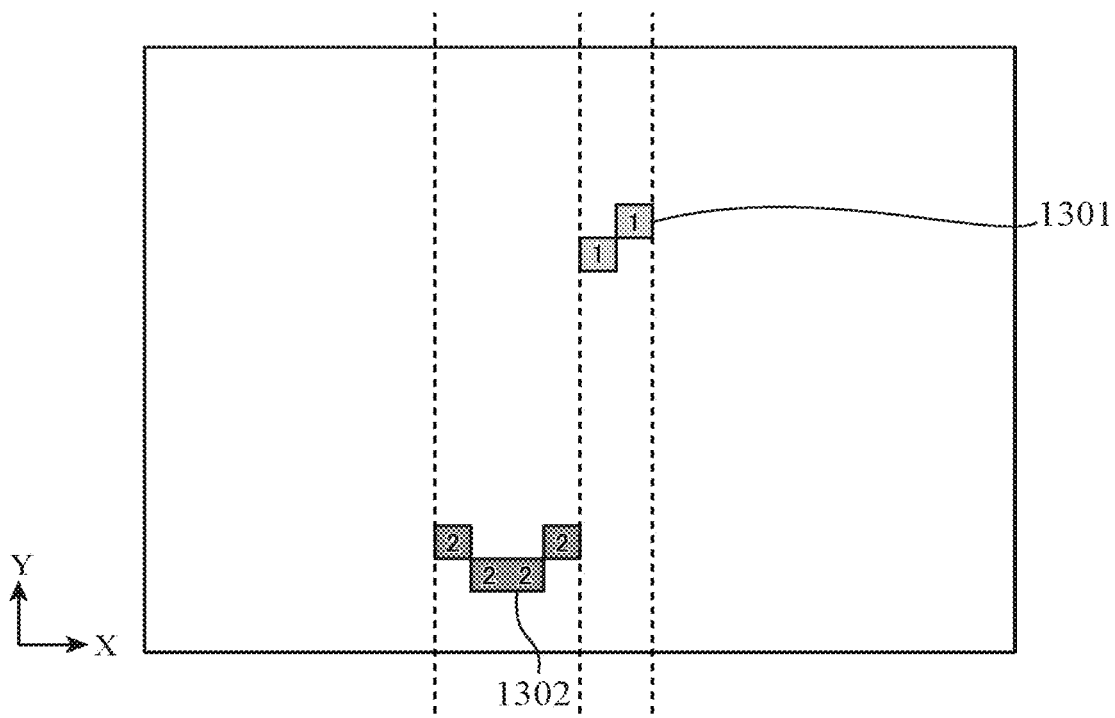
FIG. 25 are diagrams for describing specific operation for assigning, by a label dividing unit, label numbers to respective grids included in changed regions having not been subjected to labeling in the second embodiment.
Figure 26A:
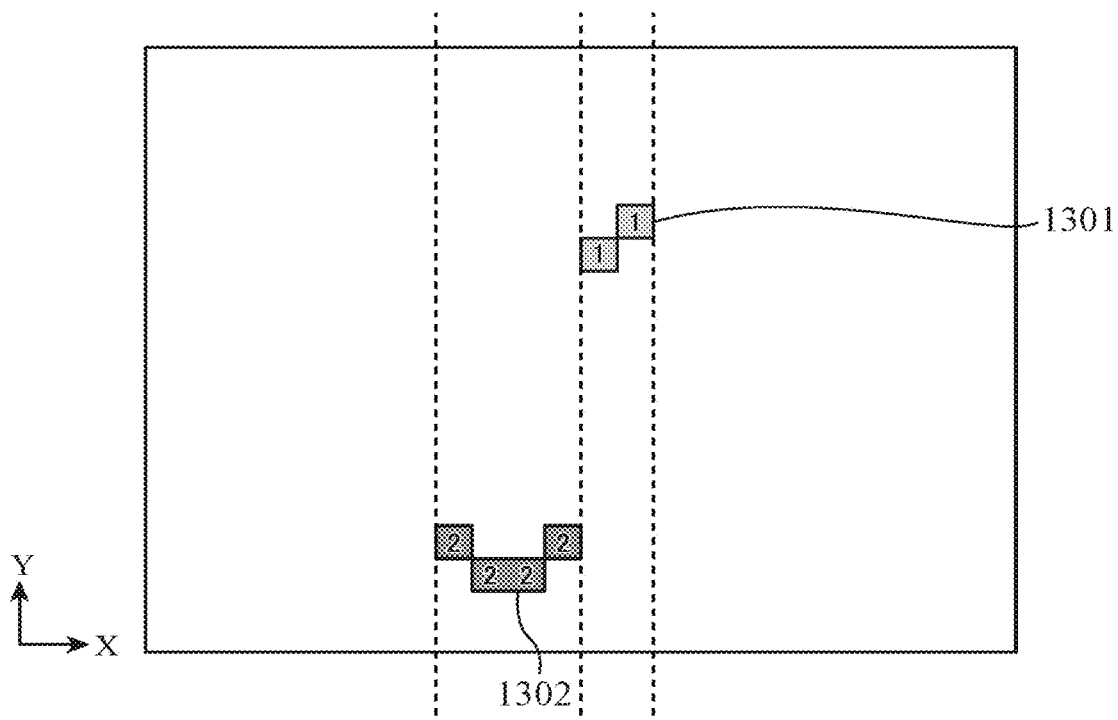
FIG. 26 are diagrams for describing specific operation for assigning, by the label dividing unit, label numbers to the respective grids included in the changed regions having not been subjected to labeling in the second embodiment.

FIGS. 25A and 26A show directly-above viewpoint images showing labeled transformed changed regions 1301 and 1302. In FIGS. 25A and 26A, each grid included in the labeled transformed changed regions 1301 and 1302 is additionally noted with a label number assigned by the directly-above image labeling unit 90.

Figure 25B:
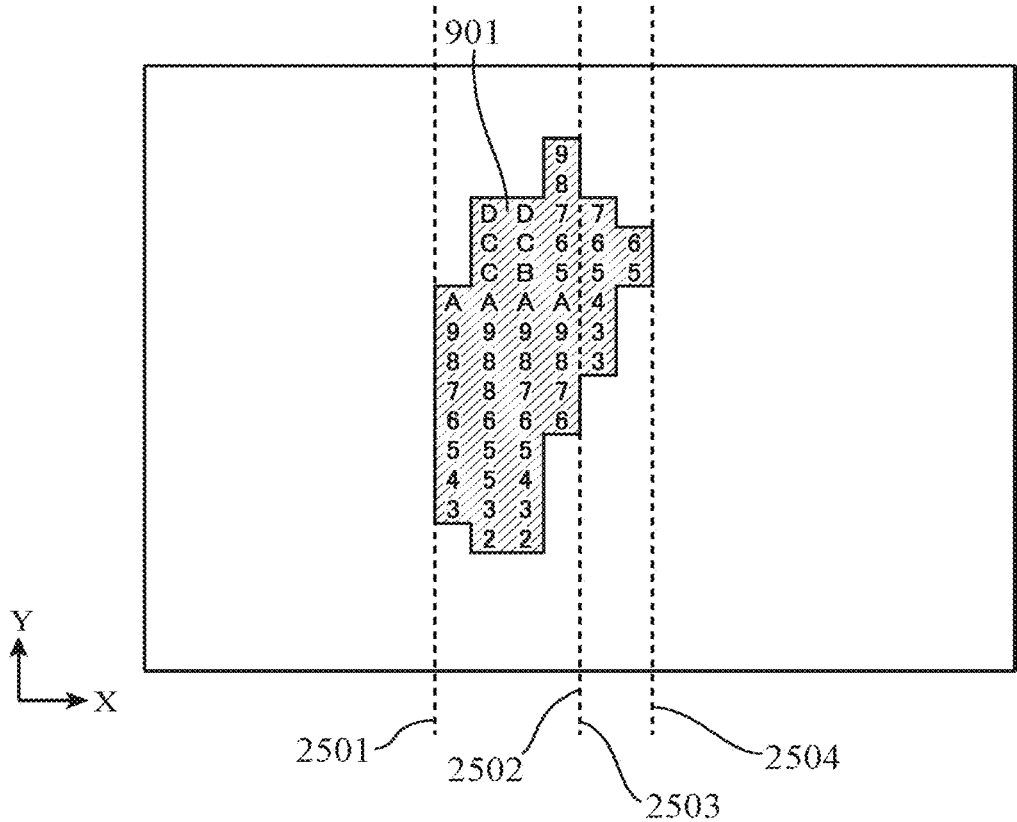

In addition, FIG. 25B shows a frontal viewpoint image showing changed regions 901, and each grid included in the changed regions 901 is additionally noted with a difference in distance between current data and comparison data as a number.

Figure 26B:
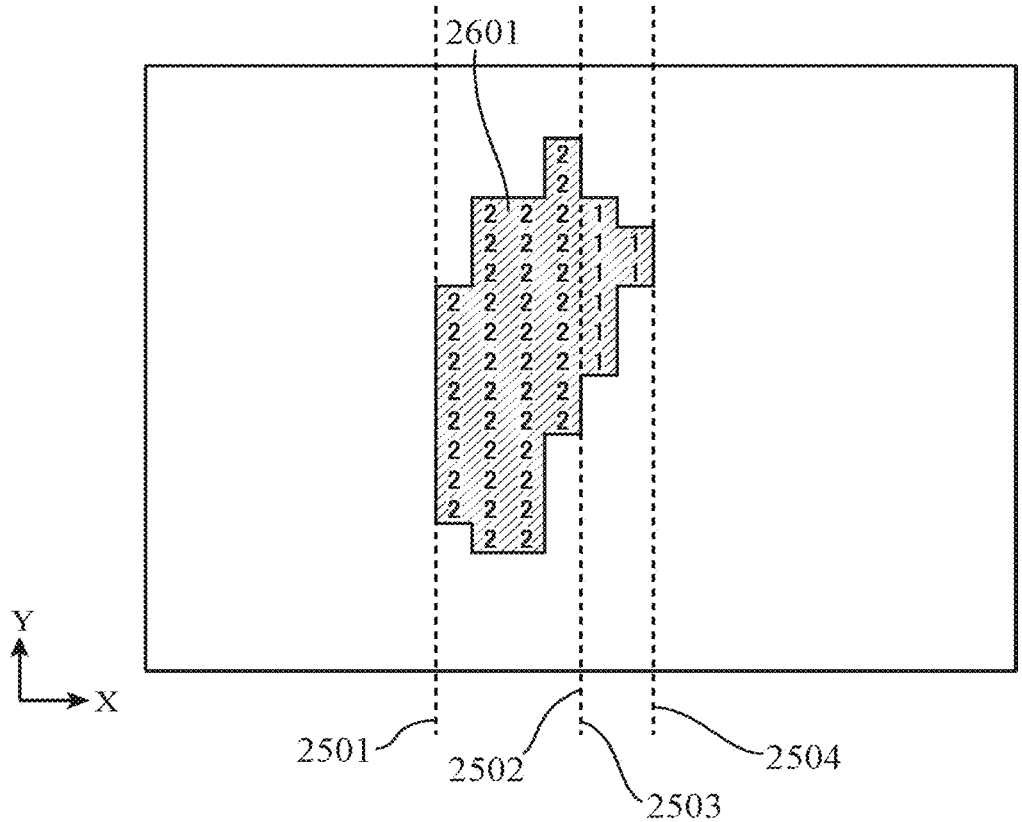

In addition, FIG. 26B shows a frontal viewpoint image showing changed regions 901 obtained after assigning label numbers by the label dividing unit 110a, and each grid included in the changed regions 901 is additionally noted with a label number assigned by the label dividing unit 110a.

First, as shown in FIG. 25, the label dividing unit 110a determines the positions of both ends in the X-axis direction of the target A 301 and the positions of both ends in the X-axis direction of the target B 302 from the directly-above viewpoint image (FIG. 25A). The positions of both ends of the target A 301 and the positions of both ends of the target B 302 can be determined from the label numbers assigned to the grids in the labeled transformed changed regions 1301 and 1302.

Note that in FIG. 25A the grids included in the target A 301 are grids assigned the label number "2" (see 1302 of FIG. 25A) and the grids included in the target B 302 are grids assigned the label number "1" (see 1301 of FIG. 25A).

The label dividing unit 110a sets, in the directly-above viewpoint image, straight lines that pass through each of the determined positions of both ends of the target A 301 and positions of both ends of the target B 302 and that perpendicularly intersect the X-axis.

Here, four straight lines are set that respectively pass through at a left end of the target A 301, a right end of the target A 301, a left end of the target B 302, and a right end of the target B 302 along the X-axis. In FIG. 25, the four straight lines are indicated by an A's left dotted line 2501, an A's right dotted line 2502, a B's left dotted line 2503, and a B's right dotted line 2504, respectively. Note that here the A's right dotted line 2502 and the B's left dotted line 2503 overlap each other.

Furthermore, the label dividing unit 110a sets each of the A's left dotted line 2501, the A's right dotted line 2502, the B's left dotted line 2503, and the B's right dotted line 2504 which are set in the directly-above viewpoint image, in the frontal viewpoint image (FIG. 25B), too, such that they are set in the same positions as the X-axis positions in the directly-above viewpoint image.

As shown in FIG. 9, a label number is not assigned to any of the grids in the changed regions 901, and the grids included in the target A 301 are not separated from the grids included in the target B 302. However, by the straight lines set in the frontal viewpoint image, even in such changed regions 901, each of the positions of the grids included in the target A 301 and the grids included in the target B 302 can be determined.

As shown in FIG. 25B, the label dividing unit 110a separates the grids in the changed regions 901 into the grids included in the target A 301 and the grids included in the target B 302, according to the A's left dotted line 2501, the A's right dotted line 2502, the B's left dotted line 2503, and the B's right dotted line 2504, and assigns label numbers such that different label numbers are assigned to different objects 201.

Here, as shown in FIG. 26B, the label dividing unit 110a allows label numbers assigned to the grids included in changed regions 2601 to match the label numbers assigned to the grids in the labeled transformed changed regions 1301 and 1302. Specifically, the label dividing unit 110a assigns label numbers such that the label number of the grids included in the target A 301 is "2" and the label number of the grids included in the target B 302 is "1".

Note that this is merely an example, and the configuration may be any as long as the label dividing unit 110a assigns label numbers to grids that are included in a plurality of different objects 201 and determined on the basis of the label numbers assigned to the grids included in the labeled transformed changed regions 1301 and 1302, on a per included object 201 basis.

The label dividing unit 110a uses the changed regions assigned label numbers which are assigned to each grid, as fixed labeled changed regions, and outputs information on a frontal viewpoint image showing the fixed labeled changed regions to the object identifying unit 120.

The object identifying unit 120 identifies objects 201 present in the field of view of the three-dimensional laser scanner 10, on the basis of the information on a frontal viewpoint image showing the fixed labeled changed regions which is outputted from the label dividing unit 110a (step ST2413).

Specific operation is the same as that at step ST2014 of FIG. 20 which is described in the first embodiment and thus a detailed description thereof is omitted, but at this step ST2413 the object identifying unit 120 sets Feret diameters such that each Feret diameter includes grids included in the same object 201.

Figure 27:
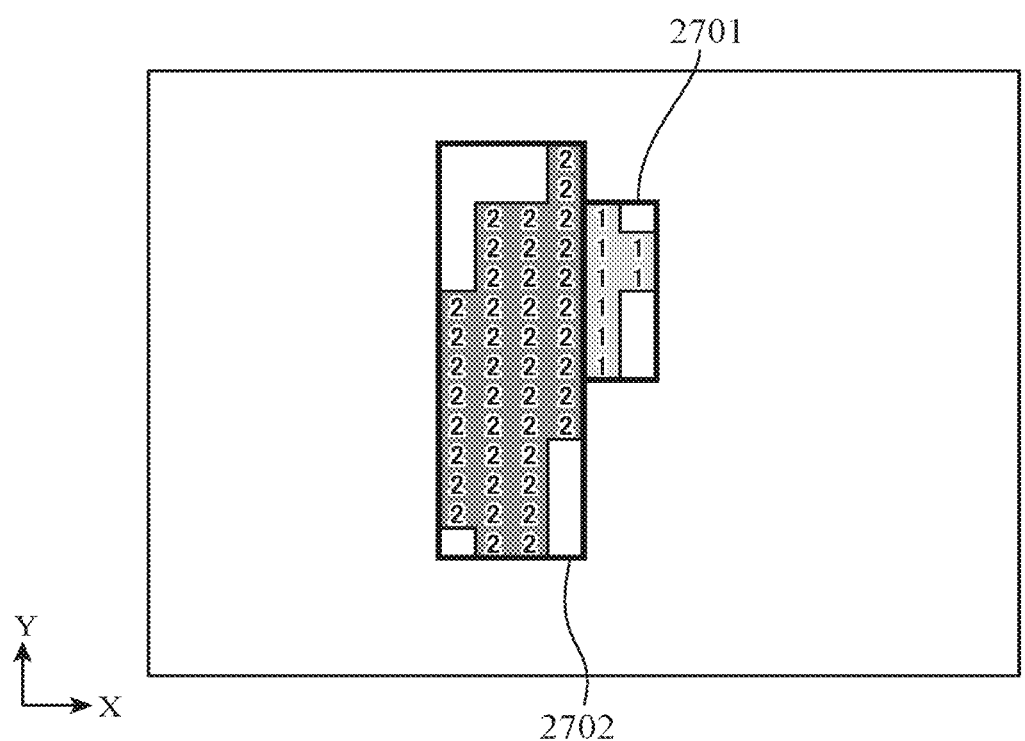
FIG. 27 is a diagram showing an example of setting Feret diameters for grids in fixed labeled changed regions by the object identifying unit in the second embodiment.

FIG. 27 is a diagram showing an example of setting Feret diameters for grids in fixed labeled changed regions by the object identifying unit 120 in the second embodiment.

Note that FIG. 27 shows an image of a frontal viewpoint image showing fixed labeled changed regions set with Feret diameters.

As shown in FIG. 27, the object identifying unit 120 sets circumscribed rectangles for the grids assigned the label number "1" and the grids assigned the label numbers "2", and sets a first Feret diameter 2701 and a second Feret diameter 2702. Here, the circumscribed rectangle for the grids assigned the label number "1" is the first Feret diameter 2701, and the circumscribed rectangle for the grids assigned the label number "2" is the second Feret diameter 2702. Namely, the grids included in the target A 301 having the second Feret diameter 2702 and the grids included in the target B 302 having the first Feret diameter 2701 are separated from each other.

The object identifying unit 120 uses fixed labeled changed regions assigned information on the first Feret diameter 2701 and the second Feret diameter 2702, as recognition target regions, and outputs information on a frontal viewpoint image showing the recognition target regions to the recognition processing unit 50.

As described above, in the first embodiment, a labeling process is performed twice by the front image labeling unit 100 and the directly-above image labeling unit 90, whereas in the second embodiment, only one labeling process by the directly-above image labeling unit 90 is performed. That is, a labeling process by the front image labeling unit 100 is omitted, and the label dividing unit 110a directly assigns label numbers to each grid included in information on changed regions which is outputted from the changed-region extracting unit 40. By this, labeling is performed without taking into account an adjacent condition for each grid included in the changed regions, and thus, there is a possibility that a noise-related changed region which is originally isolated and supposed to be ignored cannot be removed and a grid in the noise-related changed region is included inside a Feret diameter, but the amount of computation can be minimized.

As described above, according to the second embodiment, the configuration includes the directly-above image labeling unit 90 that puts adjacent pixels together into one aggregate among pixels included in changed regions shown in a directly-above viewpoint image created by the coordinate transforming unit 80, and assigns labels on an aggregate-by-aggregate basis; and the label dividing unit 110a that assigns labels for each physical object to respective pixels included in changed regions shown in a frontal viewpoint image, using the labels assigned by the directly-above image labeling unit 90, and the object identifying unit 120 identifies a plurality of physical objects present in the monitoring region, on the basis of the labels assigned by the label dividing unit 110a, and thus, compared with a case in which label numbers are assigned to grids included in changed regions by performing a labeling process once and then the label numbers are changed such that different label numbers are assigned to different objects 201, objects can be identified using differences in distance and without performing three-dimensional labeling while the amount of computation is further suppressed.

Note that in the above-described first and second embodiments, an image showing transformed changed regions which is created by the coordinate transforming unit 80 performing a coordinate transformation on changed regions is an image (directly-above viewpoint image) obtained by transforming a frontal viewpoint image such that the viewpoint of the three-dimensional laser scanner 10 is moved to a viewpoint in a right-above direction.

However, the configuration is not limited thereto, and an image showing transformed changed regions which is created by the coordinate transforming unit 80 performing a coordinate transformation on changed regions may be an image (directly-below viewpoint image) obtained by transforming a frontal viewpoint image such that the viewpoint of the three-dimensional laser scanner 10 is moved to a viewpoint in a right-below direction.

In this case, the directly-above image labeling unit 90 performs labeling on respective grids included in transformed changed regions, on the basis of information on a directly-below viewpoint image showing the transformed changed regions which is outputted from the coordinate transforming unit 80.

Note also that in the invention of the present application, a free combination of the embodiments, modifications to any component of the embodiments, or omissions of any component in the embodiments are possible within the scope of the invention.

INDUSTRIAL APPLICABILITY

Monitoring devices according to the invention enable to identify objects without performing three-dimensional labeling and thus can be applied to, for example, monitoring devices that recognize objects present in a monitoring region.

REFERENCE SIGNS LIST

10: Three-dimensional laser scanner, 11: Laser light emitting unit, 12: Laser light pulse, 13: Dispersion mechanism, 14: Dispersed laser light pulse, 15: Reflected laser light, 16: Laser light receiving unit, 17: Point group data, 20: Current data computing unit, 21: Current data accumulating unit, 30: Comparison data computing unit, 31: Comparison data accumulating unit, 40: Changed-region extracting unit, 50: Recognition processing unit, 60: Notification processing unit, 70: Front image creating unit, 80: Coordinate transforming unit, 90: Directly-above image labeling unit, 100: Front image labeling unit, 110 and 110a: Label dividing unit, 120: Object identifying unit, 200: Background, 201: Object, 300: PC, 301: Target A, 302: Target B, 303: Floor, 304: Blank grid, 1000 and 1000a: Monitoring device, 2201: Processing circuit, 2202: HDD, 2203: Input interface device, 2204: Output interface device, 2205: Memory, and 2206: CPU.

The invention claimed is:

1. A monitoring device comprising:
   a processor; and
   a memory storing instructions, which upon executed by the processor, cause the processor to perform a process of:
   obtaining pieces of distance data representing distances to a plurality of physical objects present in a monitoring region, from measurement results obtained by a three-dimensional laser scanner, and using the distance data as current distance data, the three-dimensional laser scanner measuring the monitoring region;
   obtaining past distance data from the measurement results, and converting the past distance data into comparison distance data;
   calculating difference values between the current distance data and the comparison distance data, and extracting changed regions whose difference values are greater than or equal to a threshold;
   creating a new image obtained by, independent of a previously captured above or below image, transforming a frontal viewpoint image such that a viewpoint of the three-dimensional laser scanner is moved from frontal to above or below, the frontal viewpoint image being based on the current distance data and the changed regions extracted by the process, so that the difference in distance between the plurality of physical objects is represented in the transformed frontal viewpoint image; and
   identifying the plurality of physical objects present in the monitoring region on a basis of the frontal viewpoint image and the new image created by the process.

2. The monitoring device according to claim 1, wherein the new image is obtained by transforming the frontal viewpoint image such that the viewpoint of the three-dimensional laser scanner is moved from frontal to a directly-above viewpoint, including moved from frontal to right-above viewpoint.

3. The monitoring device according to claim 1, wherein the new image is obtained by transforming the frontal viewpoint image such that the viewpoint of the three-dimensional laser scanner is moved from frontal to a directly-below viewpoint, including moved from frontal to right-below viewpoint.

4. The monitoring device according to claim 1, the process further comprising:
   putting adjacent pixels together into one aggregate among pixels included in the changed regions shown in the image created by the process, and assigning labels on an aggregate-by-aggregate basis; and
   assigning labels for each physical object to respective pixels included in the changed regions shown in the frontal viewpoint image, using the labels assigned by the process, wherein
   the process identifies the plurality of physical objects present in the monitoring region, on a basis of the labels assigned by the process.

5. The monitoring device according to claim 4, the process further comprising
   putting adjacent pixels together into one aggregate among the pixels included in the changed regions shown in the frontal viewpoint image, and assigning labels on an aggregate-by-aggregate basis, wherein
   the process reassigns, using the labels assigned by the process, the labels previously assigned, by the process, to the respective pixels included in the changed regions shown in the frontal viewpoint image, such that different labels are assigned to the different physical objects, and
   the process identifies the plurality of physical objects present in the monitoring region, on a basis of the labels reassigned by the process.

6. The monitoring device according to claim 1, wherein the process creates the image by performing a coordinate transformation between the distance data and coordinate values on a Y-axis on coordinates of the changed regions shown in the frontal viewpoint image with reference to an X-axis.

* * * * *